US007289014B2

(12) United States Patent
Mullet et al.

(10) Patent No.: US 7,289,014 B2
(45) Date of Patent: Oct. 30, 2007

(54) SYSTEM FOR AUTOMATICALLY MOVING ACCESS BARRIERS AND METHODS FOR USING THE SAME

(75) Inventors: Willis J Mullet, Gulf Breeze, FL (US); Thomas B Bennett, III, Wooster, OH (US); Albert W Mitchell, Pace, FL (US); Richard Bardin, Milton, FL (US); Jason Mamaloukas, Pensacola, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 269 days.

(21) Appl. No.: 10/744,180

(22) Filed: Dec. 23, 2003

(65) Prior Publication Data

US 2005/0134426 A1 Jun. 23, 2005

(51) Int. Cl.
*B60R 25/00* (2006.01)

(52) U.S. Cl. ........................ 340/5.7; 340/5.71; 340/5.1; 340/5.2; 340/5.21; 340/5.61; 340/5.62; 340/5.63; 340/825.69; 340/825.72; 340/5.3

(58) Field of Classification Search ........... 340/825.69, 340/5.23, 5.71, 5.2, 5.21, 5.61, 5.62, 5.63, 340/5.7, 825.72, 5.72, 5.73, 5.1, 5.3; 341/176; 187/280, 301

See application file for complete search history.

(56) References Cited

U.S. PATENT DOCUMENTS

| | | | | | |
|---|---|---|---|---|---|
| 4,025,791 | A | | 5/1977 | Lennington et al. | 250/341 |
| 4,121,102 | A | | 10/1978 | Wilson | 250/341 |
| 4,207,468 | A | | 6/1980 | Wilson | 250/341 |
| 4,398,172 | A | | 8/1983 | Carroll et al. | 340/38 P |
| 5,243,652 | A | | 9/1993 | Teare et al. | 380/21 |
| 5,311,186 | A | | 5/1994 | Utsu et al. | 342/51 |
| 5,379,033 | A | * | 1/1995 | Fujii et al. | 340/5.64 |
| 5,406,275 | A | | 4/1995 | Hassett et al. | 340/933 |
| 5,504,482 | A | | 4/1996 | Schreder | 340/995 |
| 5,519,403 | A | | 5/1996 | Bickley et al. | 342/352 |
| 5,559,520 | A | | 9/1996 | Barzegar et al. | 342/357 |
| 5,648,767 | A | | 7/1997 | O'Connor et al. | 340/928 |
| 5,661,804 | A | * | 8/1997 | Dykema et al. | 380/274 |
| 5,678,182 | A | | 10/1997 | Miller et al. | 455/33.1 |
| 5,689,269 | A | | 11/1997 | Norris | 342/357 |
| 5,699,055 | A | | 12/1997 | Dykema et al. | 340/825.22 |
| 5,903,226 | A | | 5/1999 | Suman et al. | 340/825.69 |

(Continued)

FOREIGN PATENT DOCUMENTS

| | | |
|---|---|---|
| EP | 1 176 392 | 1/2002 |

*Primary Examiner*—Brian Zimmerman
*Assistant Examiner*—Vernal Brown
(74) *Attorney, Agent, or Firm*—Renner Kenner Greive Bobak Taylor & Weber

(57) ABSTRACT

An operator system and related methods for automatically controlling access barriers including a controller associated with at least one access barrier and a transceiver associated with the controller for transmitting and receiving operational signals. The system also includes at least one proximity device capable of communicating operational signals with the transceiver based upon a position of the proximity device with respect to the barrier, wherein the controller monitors the operational signals and controls the position of the access barrier based upon the operation signals. Such a system allows for hands-free operation of the access barrier. Ground loop detectors and a global positioning system may also be incorporated into the system. And the system may be used to control the directional flow of traffic on a one-way road.

71 Claims, 15 Drawing Sheets

U.S. PATENT DOCUMENTS

| | | | | | |
|---|---|---|---|---|---|
| 5,990,828 | A * | 11/1999 | King | 342/359 |
| 6,002,332 | A * | 12/1999 | King | 340/545.1 |
| 6,206,282 | B1 | 3/2001 | Hayes et al. | 235/375 |
| 6,219,613 | B1 | 4/2001 | Terrier et al. | 701/207 |
| 6,229,988 | B1 | 5/2001 | Stapefeld et al. | 485/38.3 |
| 6,271,765 | B1 * | 8/2001 | King et al. | 340/825.69 |
| 6,285,931 | B1 | 9/2001 | Hattori et al. | 701/29 |
| 6,294,981 | B1 | 9/2001 | Herrmannsdorfer et al. | 340/286.02 |
| 6,370,475 | B1 | 4/2002 | Breed et al. | 701/301 |
| 6,411,889 | B1 | 6/2002 | Mizunuma et al. | 701/117 |
| 6,415,439 | B1 | 7/2002 | Randell et al. | 725/153 |
| 6,429,768 | B1 | 8/2002 | Flick | 340/52 |
| 6,512,466 | B2 | 1/2003 | Flick | 340/989 |
| 6,535,143 | B1 | 3/2003 | Miyamoto et al. | 340/933 |
| 6,563,431 | B1 | 5/2003 | Miller, Jr. | 340/932.2 |
| 6,593,845 | B1 | 7/2003 | Friedman et al. | 340/10.33 |
| 6,616,034 | B2 | 9/2003 | Wu et al. | 235/375 |
| 6,634,408 | B2 | 10/2003 | Mays | 160/188 |
| 6,731,199 | B1 * | 5/2004 | Ueda | 340/10.4 |
| 2002/0165910 | A1 * | 11/2002 | Brown et al. | 709/203 |
| 2003/0023881 | A1 * | 1/2003 | Fitzgibbon et al. | 713/202 |
| 2003/0043021 | A1 | 3/2003 | Chung | 340/5.71 |
| 2003/0112121 | A1 * | 6/2003 | Wilson | 340/5.61 |
| 2004/0012483 | A1 * | 1/2004 | Mays | 340/5.71 |
| 2004/0037365 | A1 * | 2/2004 | King et al. | 375/268 |
| 2004/0239482 | A1 | 12/2004 | Fitzgibbon | 340/5.61 |
| 2005/0057340 | A1 | 3/2005 | Fitzgibbon | 340/5.71 |
| 2006/0038656 | A1 | 2/2006 | Wilson | 340/5.61 |

* cited by examiner

SYSTEM FOR AUTOMATICALLY MOVING ACCESS BARRIERS AND METHODS FOR USING THE SAME

TECHNICAL FIELD

Generally, the present invention relates to an access barrier control system, such as a garage door operator system for use on a closure member moveable relative to a fixed member and methods for programming and using the same. More particularly, the present invention relates to the use of proximity devices, such as transponders and/or global positioning systems, to determine the position of a carrying device, such as an automobile, to influence the opening and closing of an access barrier depending upon the position of the carrying device relative to the access barrier.

BACKGROUND ART

When constructing a home or a facility, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command input signals—for the purpose of opening and closing the door—from a wireless remote, from a wired wall station, from a keyless entry device or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency or infrared transmitter to actuate the motor and move the door in the desired direction. These remote devices allow for users to open and close garage doors without having to get out of their car. These remote devices may also be provided with additional features such as the ability to control multiple doors, lights associated with the doors, and other security features. As is well documented in the art, the remote devices and operators may be provided with encrypted codes that change after every operation cycle so as to make it virtually impossible to "steal" a code and use it a later time for illegal purposes. An operation cycle may include opening and closing of the barrier, turning on and off a light that is connected to the operator and so on.

Although remote transmitters and like devices are convenient and work well, the remote transmitters sometimes become lost, misplaced or broken. In particular, the switch mechanism of the remote device typically becomes worn after a period of time and requires replacement. Moreover, use of the remote transmitter devices require the use of batteries which also necessitate replacement after a period of time. And although it is much easier to actuate the remote transmitter than for one to get out of an automobile and manually open the door or access barrier, it is believed that the transmitter and related systems can be further improved to obtain "hands-free" operation. Although there are some systems that utilize transponders for such a purpose, these systems still require the user to place an access card or similar device in close proximity to a reader. As with remote transmitters, the access cards sometimes become lost and/or misplaced. A further drawback of these access cards is that they do not allow for programmable functions to be utilized for different operator systems and as such do not provide an adequate level of convenience.

Another type of hands-free system utilizes a transponder, carried by an automobile, that communicates with the operator. The operator periodically sends out signals to the transponder and when no return signal is received, the operator commands the door to close. Unfortunately, the door closing may be initiated with the user out of visual range of the door. This may lead to a safety problem inasmuch as the user believes that the door has closed, but where an obstruction may have caused the door to open and remain open thus allowing unauthorized access.

Therefore, there is a need in the art for a system that automatically moves access barriers depending upon the direction of travel of a device carrying a proximity device such as a transponder or global positioning sensor.

DISCLOSURE OF THE INVENTION

One of the aspects of the present invention, which shall become apparent as the detailed description proceeds, is an operator system for automatically controlling access barriers, comprising a controller associated with at least one access barrier; a radio frequency (RF) beacon transceiver associated with the controller for transmitting and receiving operational signals; and at least one proximity device capable of communicating operational signals with the RF beacon transceiver based upon a position of the proximity device with respect to the barrier wherein the controller monitors the operational signals and controls the position of the access barrier based upon the operational signals.

Another aspect of the present invention is attained by a method for teaching an operator to automatically control operation of an access barrier, comprising providing a controller to control the opening and closing movements of the access barrier; providing a proximity device with a learn button; positioning the proximity device at a first position and pressing the learn button and storing in the controller a first position signal; and generating a base profile from the first position signal, wherein the proximity device periodically generates a proximity signal such that if the proximity signal is substantially equivalent to the base profile, the controller moves the access barrier.

Still yet another aspect of the present invention is attained by a method for automatically controlling operation of an access barrier, comprising an operator controller and an associated transceiver, the transceiver emitting a periodic signal; providing a proximity device that receives the periodic signal and generates a proximity signal received by the transceiver; comparing the proximity signal to a base profile; and moving the access barrier in at least one direction whenever the proximity signal matches the base profile.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
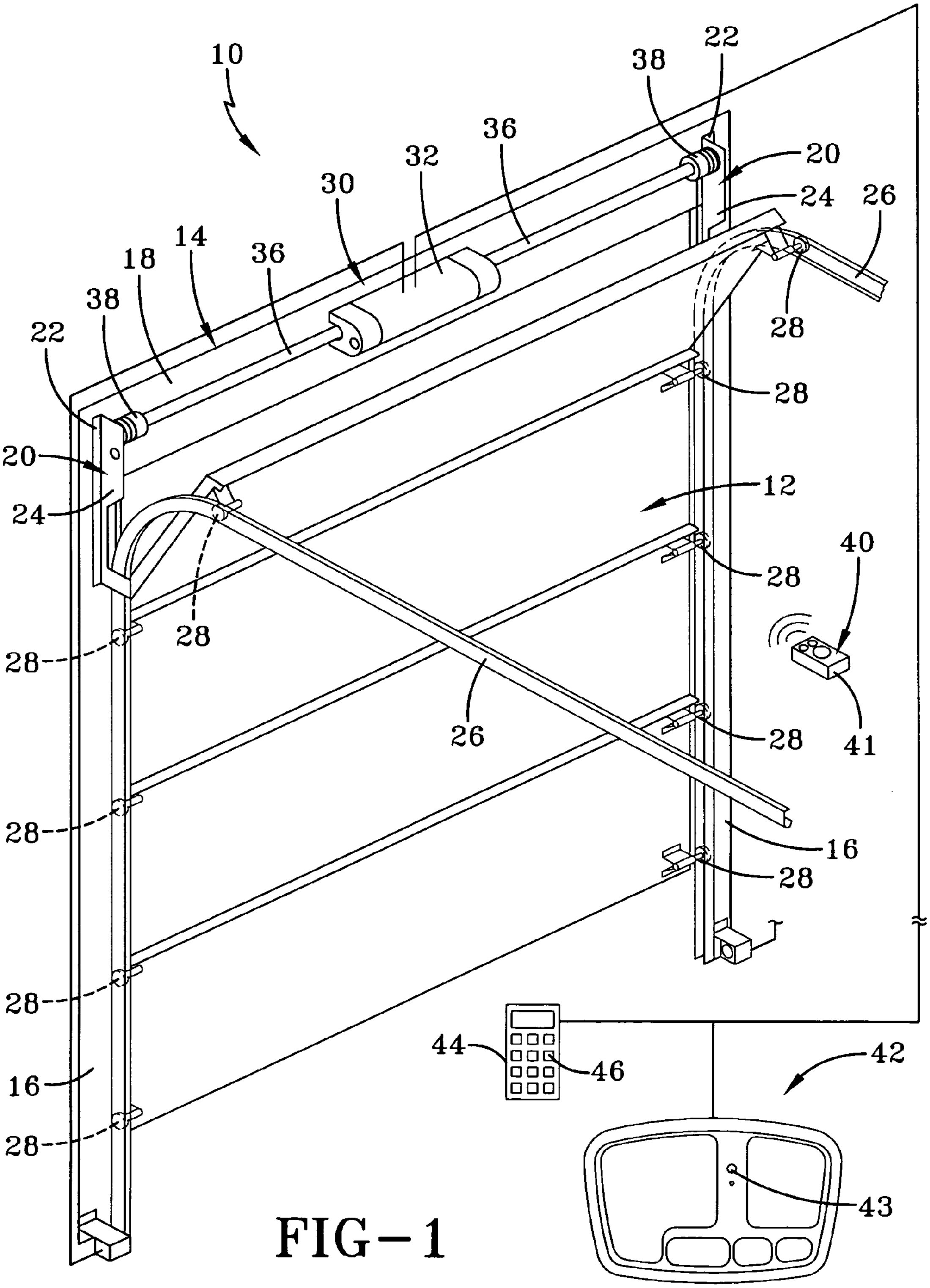
FIG. 1 is a perspective view depicting a sectional garage door and showing an operating mechanism embodying the concepts of the present invention.

A system, such as a garage door operator system which incorporates the concepts of the present invention, is generally designated by the numeral 10 in FIG. 1. Although the present discussion is specifically related to an access barrier such as a garage door, it will be appreciated that the teachings of the present invention are applicable to other types of barriers. The teachings of the invention are equally applicable to other types of movable barriers such as single panel doors, gates, windows, retractable overhangs and any device that at least partially encloses or restricts access to an area.

The system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground. The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to a lower end of each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes an operator housing 32, which is affixed to the header 18 and which contains an operator mechanism control 34 best seen in FIG. 2. Extending through the operator housing 32 is a drive shaft 36, the opposite ends of which carry cable drums 38 that are rotatably affixed to respective upper ends of projecting legs 24. The cable drums 38 store suspension cables (not shown) that have a first end attached to the cable drum 28 and a second end attached to the lower portion of the garage door 12. Carried within the drive shaft 36 are counterbalance springs as described in the '010 patent. Although a header-mounted operator is disclosed, the control features to be discussed later are equally applicable to other types of operators used with movable barriers. For example, the control routines can be easily incorporated into trolley type, screw drive and jackshaft operators used to move garage doors or other types of access barriers. The drive shaft 36 transmits the necessary mechanical power to transfer the garage door 12 between closed and open positions. In the housing 32, the drive shaft 36 is coupled to a drive gear wherein the drive gear is coupled to a motor in a manner well known in the art.

Briefly, the operator mechanism control 34 portion of the counter-balancing system 30 may be controlled by a wireless remote transmitter 40, which has a housing 41, or a wall station control 42, which has a housing, that is wired directly to the system 30 or which may communicate via radio frequency or infrared signals. The wall station control 42 is likely to have additional operational features not present in the remote transmitter 40. The wall station control 42 is carried by a housing which has a plurality of buttons thereon. Each of the buttons, upon actuation, provide a particular command to the controller to initiate activity such as the opening/closing of the barrier, turning lights on and off and the like. A program button 43, which is likely recessed and preferably actuated only with a special tool, allows for programming of the control 34 for association with remote transmitters and more importantly with a proximity device as will become apparent as the description proceeds. The system 30 may also be controlled by a keyless alphanumeric device 44. The device 44 includes a plurality of keys 46 with alphanumeric indicia thereon and may have a display. Actuating the keys 46 in a predetermined sequence allows for actuation of the system 30. At the least, the devices 40, 42 and 44 are able to initiate opening and closing movements of the door coupled to the system 30.

The operator mechanism control 34 monitors operation of the motor and various other connected element. A power source is used to energize the elements in a manner well known in the art. The operator mechanism control 34 includes a controller 52 which incorporates the necessary software, hardware and memory storage devices for controlling the operation of the operator mechanism control 34 and for implementing the various advantages of the present invention. In electrical communication with the controller 52 is a non-volatile memory storage device 54 for permanently storing information utilized by the controller in conjunction with the operation of the operator mechanism control 34. Infrared and/or radio frequency signals generated by transmitters 40, 42 and 44 are received by a receiver or beacon transceiver 56 which transfers the received information to a decoder contained within the controller. The controller 52 converts the received radio frequency signals or other types of wireless signals into a usable format. It will be appreciated that an appropriate antenna is utilized by the transceiver 56 for sending and receiving the desired radio frequency or infrared beacon signals 57 back to the various wireless transmitters.

In the preferred embodiment, the beacon transceiver 56 is a Model TRF6901 and the controller 52 is a Model MSP430F1232, both of which are supplied by Texas Instruments. Of course equivalent transceivers and controllers could be utilized. The beacon transceiver is preferably directly associated with the mechanism 34, or in the alternative, the beacon transceiver could be a stand-alone device that utilizes a 372 MHz transmitter that communicates with the controller. But, by having the transceiver directly associated with the controller they communicate directly with one another and the state of the door is immediately known. It will also be appreciated that the controller 52 is capable of directly receiving transmission type signals from a direct wire source as evidenced by the direct connection to the wall station 42. And the keyless device 44, which may also be wireless, is also connected to the controller 52. Any number of remote transmitters 40*a-x* can transmit a signal that is received by the transceiver 56 and further processed by the controller 52 as needed. Likewise, there can be any number of wall stations. If an input signal is received from a remote transmitter 40, the wall station control 42, or a keyless device 44 and found to be acceptable, the controller 52 generates the appropriate electrical input signals for energizing the motor 60 which in turn rotates the drive shaft 36 and opens and/or closes the access barrier.

A proximity device transmitter 70 is included in the system 10. The proximity device 70 includes a processor 72 and may include a non-volatile memory storage device 74. The proximity device 70 is capable of receiving the transceiver signal 57 and in turn generates a proximity or an acknowledge signal 78 so as to allow communication between the transmitter 70 and the transceiver and other like devices. It will be appreciated that the signals between the transceiver 56 and the proximity device transmitter 70 may be encrypted by using well known technologies. The proximity device 70 includes a mobile transceiver which is also referred to as a mobile transponder 76 that is capable of accepting a challenge or inquiry from an interrogator—which in this case is the beacon transceiver 56—and automatically transmitting an appropriate reply in the form of a proximity signal 78. The transponder is preferably a TRF6901 and the processor 72 is preferably a MSP4301F232, both of which are available from Texas Instruments. Of course, equivalent devices could be used. The processor 72 includes the necessary hardware, software and memory for receiving and generating signals to carry out the invention. The processor 72 and the memory 74 facilitate generation of the appropriate information to include in the proximity signal 78 inasmuch as one proximity device may be associated with several operators or in the event several proximity devices are associated with a single operator.

The proximity device transmitter 70 includes at least one learn button 82 which allows for programming of the proximity device with respect to the controller 52. Generally, the proximity device 70 allows for "hands-free" operation of the access barrier. In other words, as will be come apparent from the description to follow, the proximity device 70 may simply be placed in a glove compartment of an automobile or other carrying device and communicate with the controller 52 for the purpose of opening and closing the access barrier depending upon the position of the proximity device 70 with respect to the beacon transceiver 56. As such, after programming, the user is no longer required to press an actuation button or otherwise locate the transmitter before having the garage door open and close as desired. If needed, manual actuation of the button 82 after programming may be used to override normal operation of the proximity device so as to allow for opening and closing of the barrier and also to perform other functions associated with the operator system 34.

An activity sensor such as an engine sensor 84 may be incorporated into the proximity device 70 so as to allow for an indication as to whether the device carrying the proximity device is in an on or off condition. The sensor 84 may be a vibration sensor that detects the operational state of the vehicle's engine. Or the sensor 84 may be directly connected to the vehicle's accessory system which directly provides an operational status. This allows for confirmation of the position of the proximity device and additional system functionality.

Although it is believed that the use of the transponder is the most efficient way for operating a proximity device to operate an access barrier it will also be appreciated that the proximity device transmitter 70 may include a global positioning system 88. The global positioning system 88 receives data from a global positioning satellite 90 so as to send a precise location of the proximity device as needed. In particular, a GPS signal 92 is generated by the satellite so as to provide an appropriate signal to the GPS system 88 which is then submitted to the processor 72 for communication to the controller 52 for operation of the barrier.

Additional features that may be included with the proximity device transmitter 70 are an audio device 94 and a light device 96. It is envisioned that the audio device 94 and/or the light device 96 may be employed to provide verbal instructions/confirmation or light indications as to certain situations that need the immediate attention of the person utilizing the proximity device 70. For example, the light source may be used to provide a warning as to the state of the access barrier. The sources 94 and 96 may also provide confirmation or rejection of the attempted programming steps to be discussed later. All of the components contained with the proximity device transmitter 72 may be powered by two AA batteries which ideally have a minimum two year battery life. Of course other long-life batteries could be employed or the proximity device could be directly powered by a power supply carried by the vehicle.

A light 98 is connected to the controller 52 and may be programmed to turn on and off depending upon the conditions of the proximity device and how it is associated with the controller 52. Likewise, an alarm system 100 may be activated and/or deactivated depending upon the position of the proximity device 70 with respect to the beacon transceiver 56. The system 10 also envisions the use of a detector and/or detectors 102 which may be used to confirm the positioning of the proximity device when associated with an automobile or other large detectable object. The detector(s) 102 may be a ground loop detector for carrying devices such as automobiles, or the detector may use optical eyes or other similar sensors to confirm the presence or absence of the carrying device and transponder together. Use of the foregoing components will become apparent as the detailed description proceeds.

Figure 3:
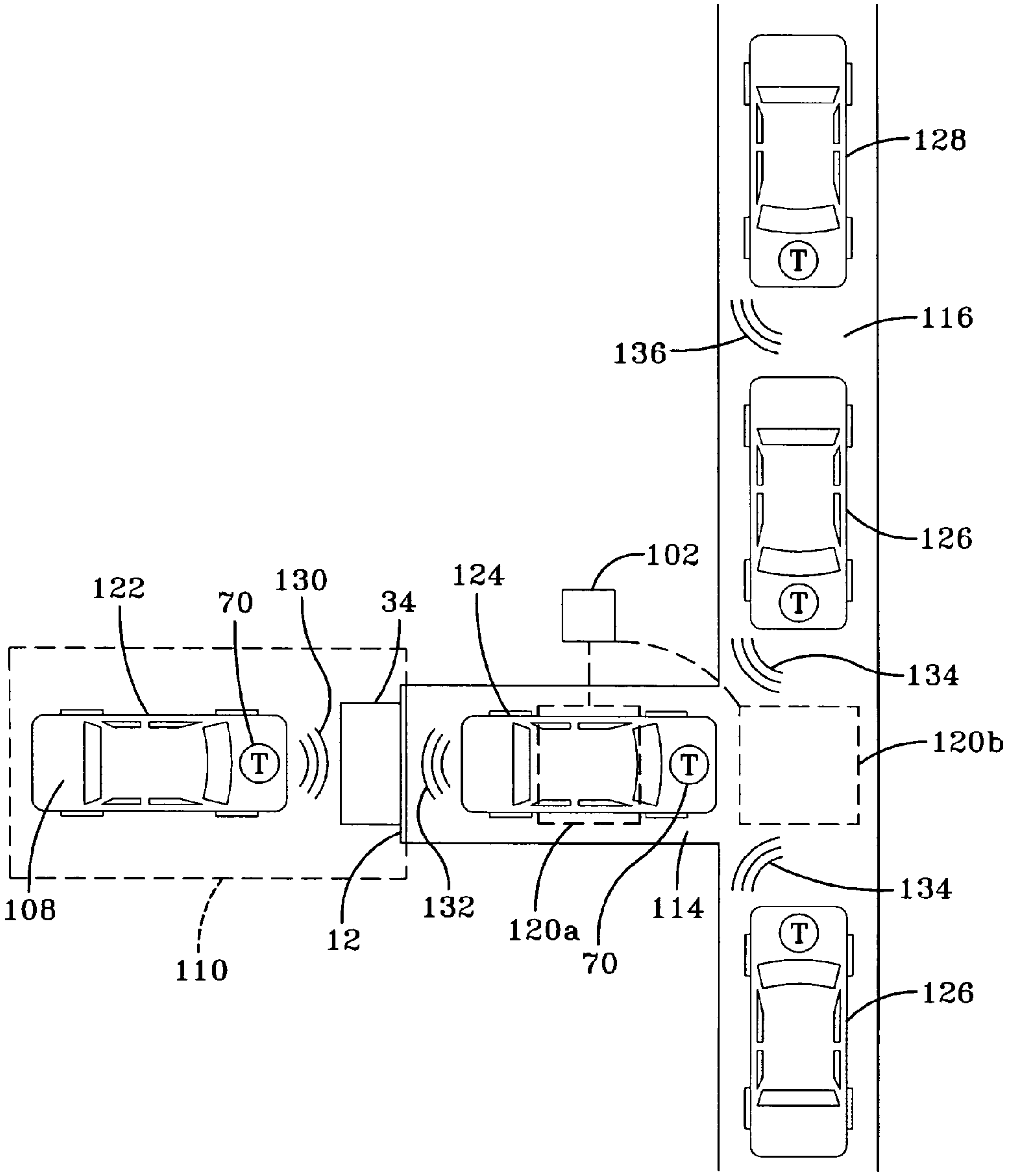
FIG. 3 is a schematic diagram of various positions of an exemplary carrying device with respect to an access barrier that utilizes the operator system according to the present invention.

Referring now to FIG. 3, a schematic diagram showing the relationship between a carrying device 108 that carries the proximity device in its various positions and the operator system 34 is shown. Typically, the carrying device is an automobile maintained in a garage or other enclosure generally indicated by the numeral 110. The enclosure 110 is separated from it's outer environs by the access barrier 12 which is controlled by the operator system 34 in the manner previously described. The enclosure 110 is accessible by a driveway 114 which is contiguous with a street 116 or other access-type road. At least one ground loop 120 may be buried underneath the enclosure, the driveway or the street. Various positions of the ground loop are denoted by an alphabetic suffix such as 120*a* at a first position, and 120*b* at a second position, etc. As will be appreciated by those skilled in the art, the ground loop detector 102 is connected to a ground loop placed in an area under which the carrying device travels. The loop detector 102 is an electronic device that converts a magnetic induction of the ground loop 120 such as when an automobile passes over or in direct association with the ground loop into a logic signal that can be used to send an appropriate signal by the detector 102 to the operator system 34. The ground loops 120 are connected to the detector 102 by a direct wire or wireless type communication device.

The carrying device 108 is positionable in the enclosure 110 or anywhere along the length of the driveway 114 and the street 116. Various critical positions are established by positioning the proximity device in predetermined locations and then learning those positions to the controller. In particular, it is envisioned that a park position 122 is for when the automobile or other carrying device is positioned within the enclosure 110. An action position 124 designates when the carrying device 108 is immediately adjacent the barrier 12, but outside the enclosure and wherein action or movement of the barrier 12 is likely desired. An energization position 126, which is somewhat removed from the action position 124, designates when an early communication link between the transponder 76 and the transceiver 56 needs to be established in preparation for moving the barrier 12 from an open to a closed position or from a closed position to an open position. Further from the energization position(s) 126 is a dormant position 128 for those positions where energization or any type of activation signal communicated between the transponder and the operator system is out of range and not recognized until the energization position(s) 126 is obtained. As will be appreciated by those skilled in the art, the various positions necessitate the generation of corresponding signals between the proximity device 70 and the operator 34, and in particular, between the transponder 76 and the beacon transceiver 56. In particular, the transponder 76 generates the proximity signal 78 which may be classified as a park signal 130, an action signal 132, an energization signal 134 or a dormant signal 136 for each corresponding position. The designation of the signals 130-136 may be determined according to their respective strengths when received by the transceiver 56. In an alternative embodiment, the park position may be classified as a "docked" state and the action, energization and dormant position as an "away" state.

In order for the transponder and the receiver to function properly, the various positions 122-128 must be associated with the operator system. Accordingly, referring now to FIG. 4 and in particular to the process indicated generally by the numeral 150, it can be seen that an initial setup step 151 is provided wherein the access barrier travel limits and other features associated with the operator system are learned to the operator. This may include the learning of safety features; the learning of the transmitters 40, 42 and 44; establishing door travel limits; setting of lighting and alarm systems and the like. At step 153, when power is initially supplied to the operator mechanism 34 and in particular to the beacon transceiver 56 it will preferably scan a minimum of 16 channels (this function can be accomplished with one channel however the greater the number of channels available in this range, the less probability of radio interference) between 868 MHz and 928 MHz using a Receiving Signal Strength Indicator (RSSI) which selects the most "quiet" frequency channel for use. This range is identified as the ISM band or Industrial, Scientific and Medical frequency spectrum used in the United States and Europe. Of course other frequency bands could be used. At this time the transceiver 56 will also check the associated memory device 54 for previously learned proximity devices 70. If no devices are designated, then the user will immediately proceed with steps 154-174. However, if there are previously learned proximity devices and they are in the "docked" state, or relatively close proximity, then the beacon transceiver 56 will send a "switch frequency" command along with a new channel frequency. Only upon successful acknowledgment by all the proximity devices 70 that there is no conflict among them will the beacon transceiver switch to an available frequency channel.

At step 152 the controller 52 is placed in a learn mode. This may be done by pressing a program button 43 on the wall station 42, a sequence of keys 46 on the key pad transmitter 44, or any other method known in the art. Programming or learning of the proximity device 72 electronically associates it with the operator mechanism 34. As such, the controller and the proximity device recognize the other's signals and the particular operating commands associated with those signals. At step 154, the proximity device 70 is positioned to the action position 124 and the learn button 82 is pressed. Accordingly, the transponder 76 sends an action signal 132 that is received by the transceiver 57. At step 156, the controller 52 measures the transponder's signal strength and subsequently at step 158, the controller determines whether the signal strength is adequate. If the signal strength is not adequate, which may be indicated by the audio device 94 or the lighting device 96, the process returns to the step 154 so that the action position may be adjusted. However, if the signal strength is determined to be adequate at step 158, then at step 160, the controller learns the action signal. At this time, the transceiver 56 returns an appropriate signal to the transponder 76 so that completion of this step may be confirmed by an audible announcement by the audio device 94 or lighting of the device 96. For example, if an action signal is appropriately received, the lighting device may flash a certain number of times. This will provide an indication to the person programming the proximity device to the controller that the next step may be taken.

At step 162, the programmer positions the transponder to the energization position 126 and again presses the learn button 82. Accordingly, the controller 34 measures the transponder signal strength at step 164. If at step 166 the controller determines that the transponder signal strength is not adequate, the processor returns to step 154 or 162 and a visual or auditory indication may be provided to the person carrying the transponder by the device 94 and/or 96. However, if it is determined that the signal strength is adequate, then at step 168 the controller learns the energization signal 134 and a confirmation signal is sent from the controller to the transponder so that confirmation is generated by the device 94 and/or lights 96.

Once the action signal and energization data signals are learned to the controller, and then at step 170 a base profile signal is generated and stored. It will be appreciated that two types of base profile signals may be stored to the controller device. One type of base profile signal will be exemplary of a decreasing signal strength for when the proximity device 70 moves from the action position to the energization position. The other base profile signal will be an increasing profile for when the transponder moves from the energization position to an action position. In any event, the base profile is stored by the controller 52 for later comparison to an actually received set of transponder signals.

Subsequent to the above steps, the programmer positions the transponder 70 to a park position 122, at step 172, and the learn button 82 is pressed so as to generate a set profile which is saved by the controller 52. The set profile may be a single measurement of the transponder's signal strength or an average signal strength for a set period of time. In other words, the set profile is a quantifiable measurement that can be used for later comparison. It will be appreciated that the park position is that position in which the transponder and associated carrying device is within the enclosure which indicates to the controller 52 that the device has been parked. An appropriate confirmation or non-confirmation signal is also sent by the transceiver to the transponder when the park position has been learned or not. And finally, at step 174, the controller 52 determines whether ground loop(s) and the associated detector is connected to the system. If so, then an appropriate flag is set in the memory device 54.

Figure 5A:
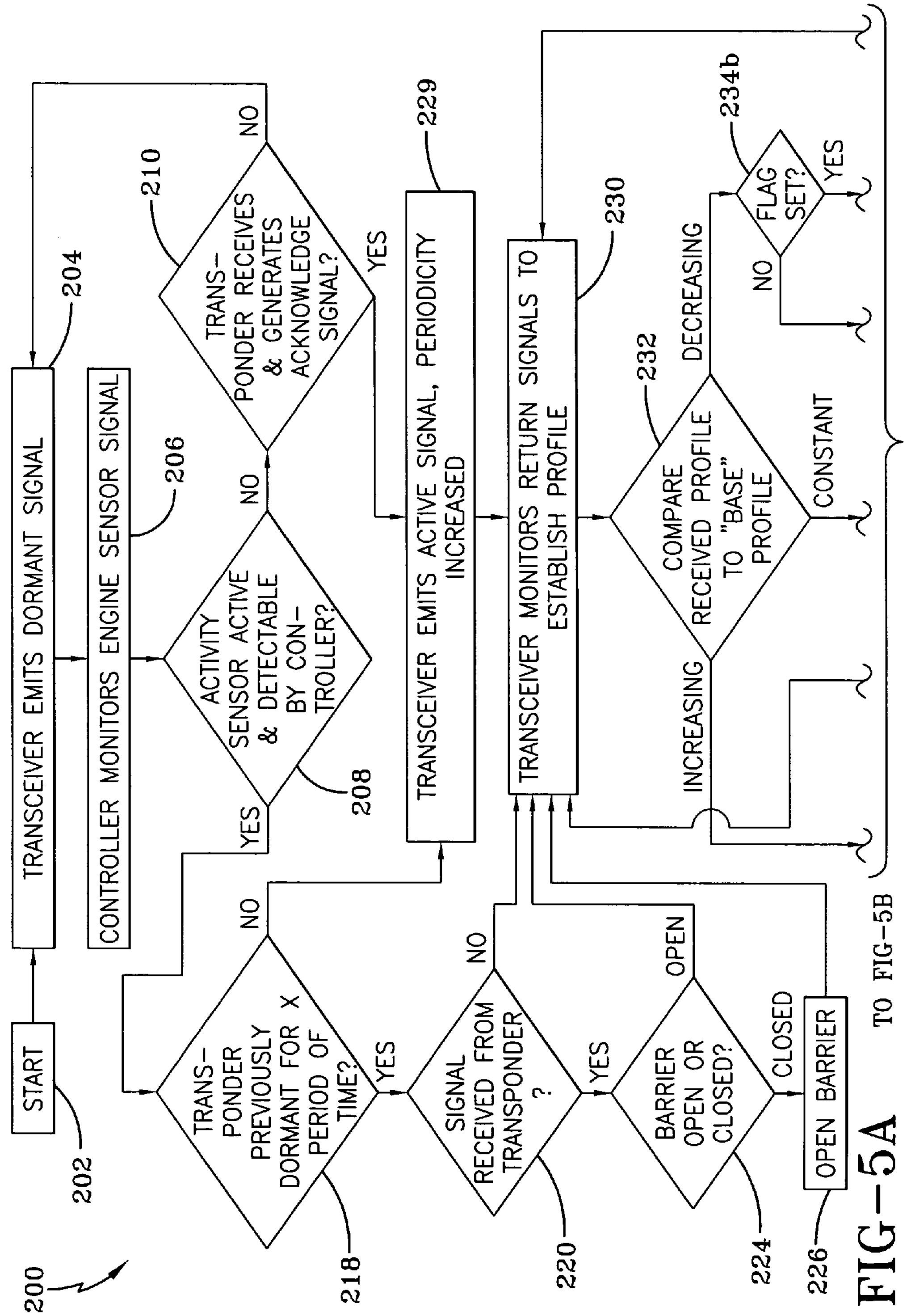
FIGS. 5A and 5B present an operational flowchart illustrating use of the operator system with the proximity device according to the present invention.
Figure 5B:
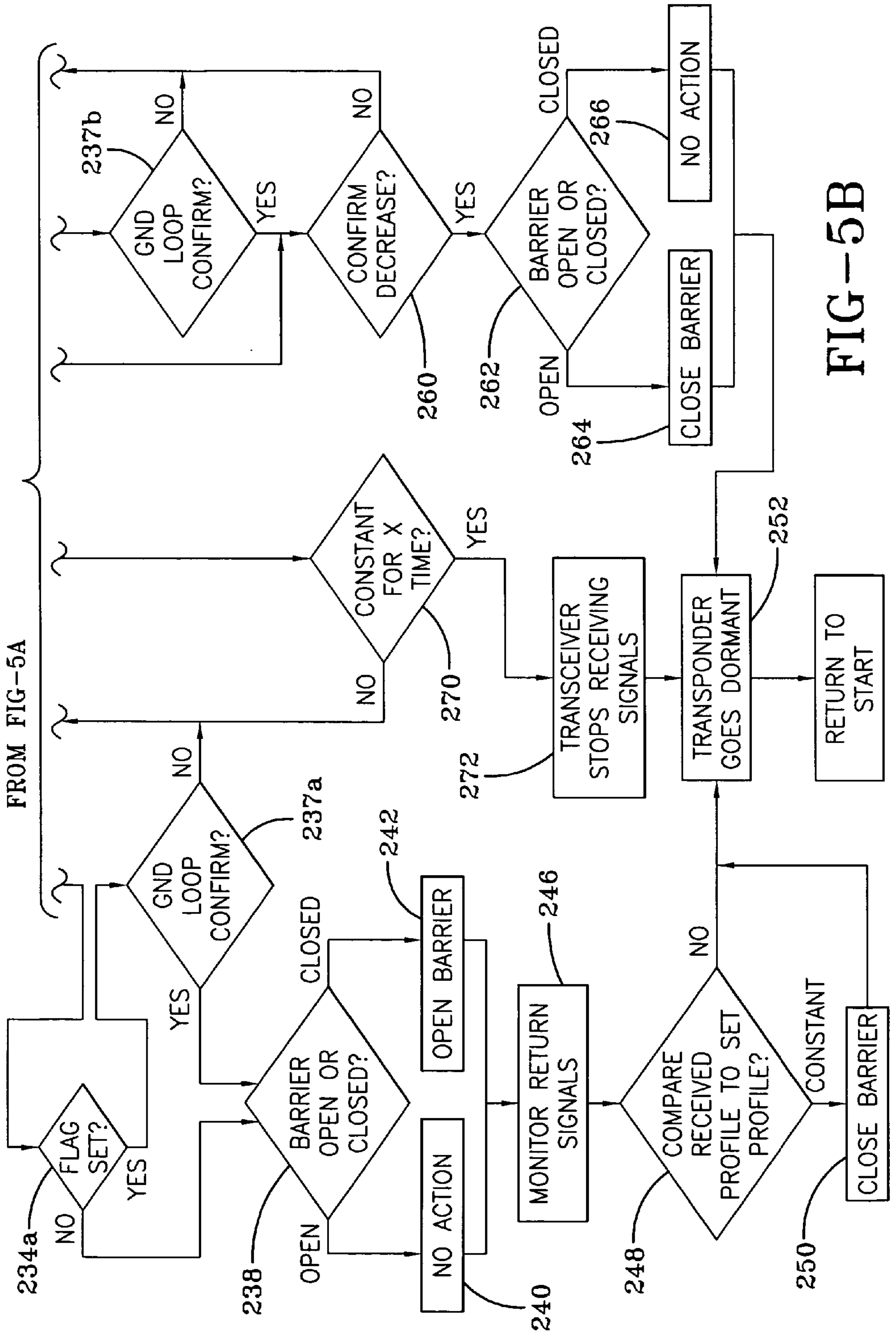
Figure 6A:
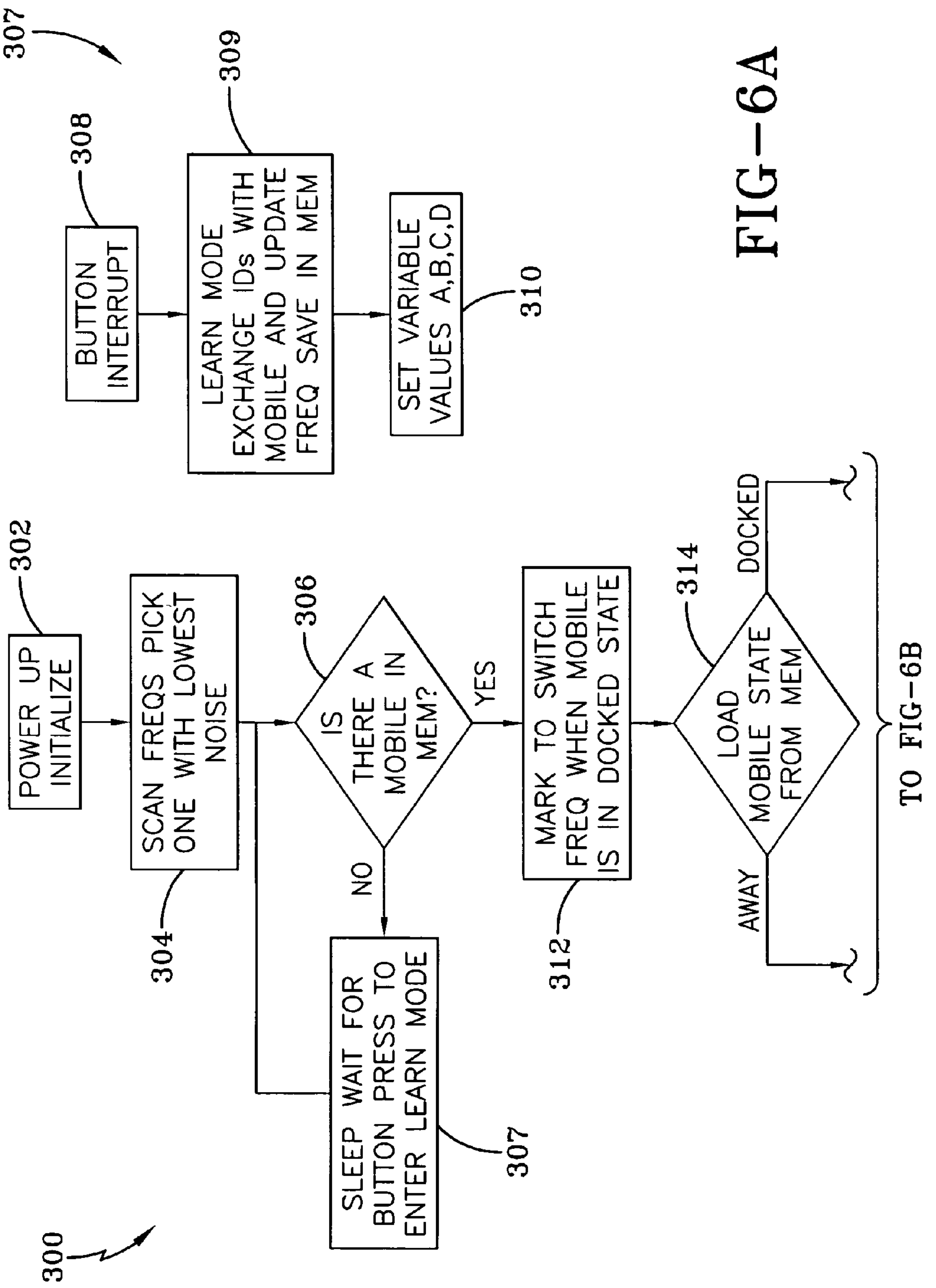
FIGS. 6A-D present an operational flow chart illustrating the programming and use of an operator system with a proximity device according to an alternative embodiment of the present invention.
Figure 6B:
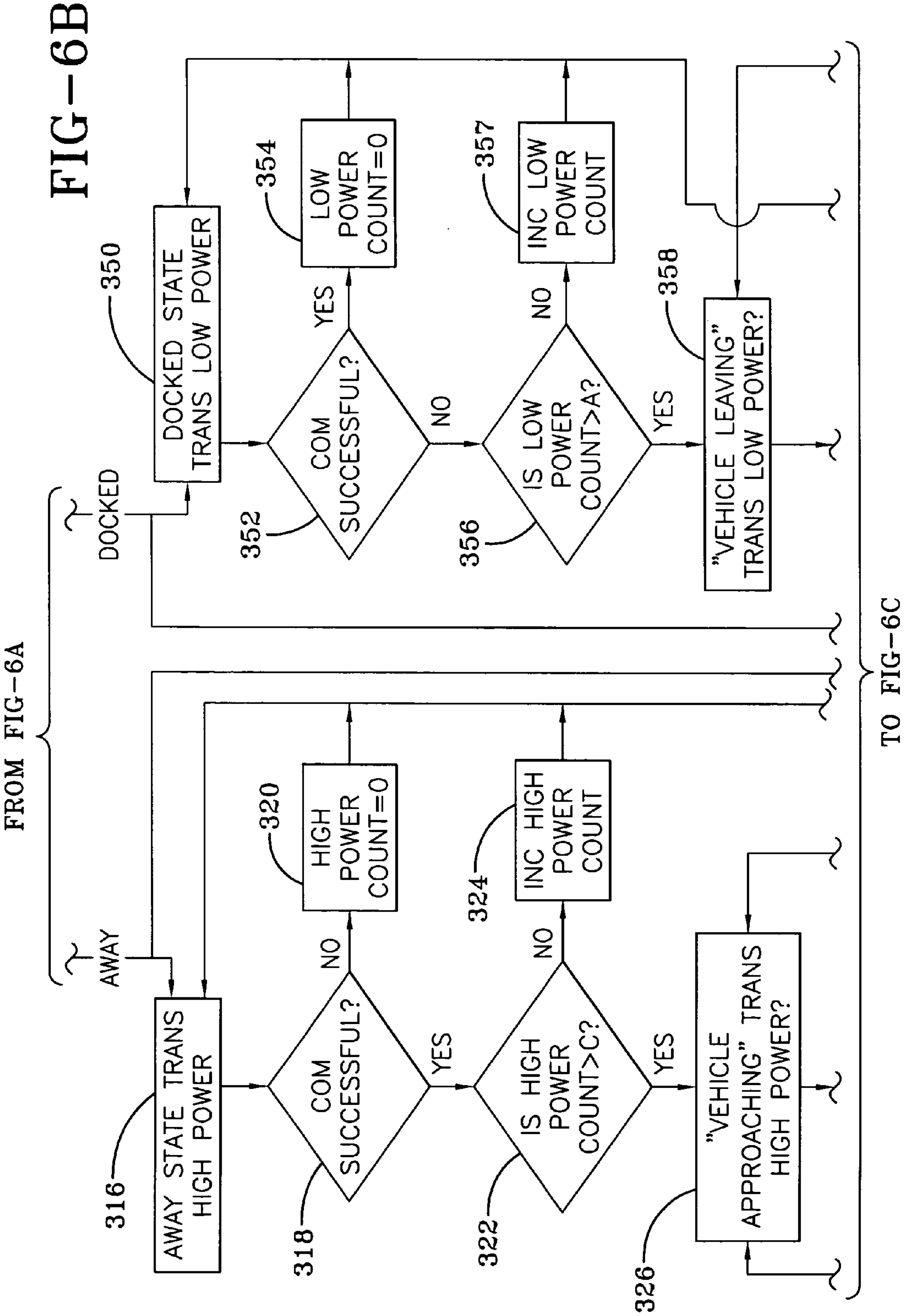
Figure 6C:
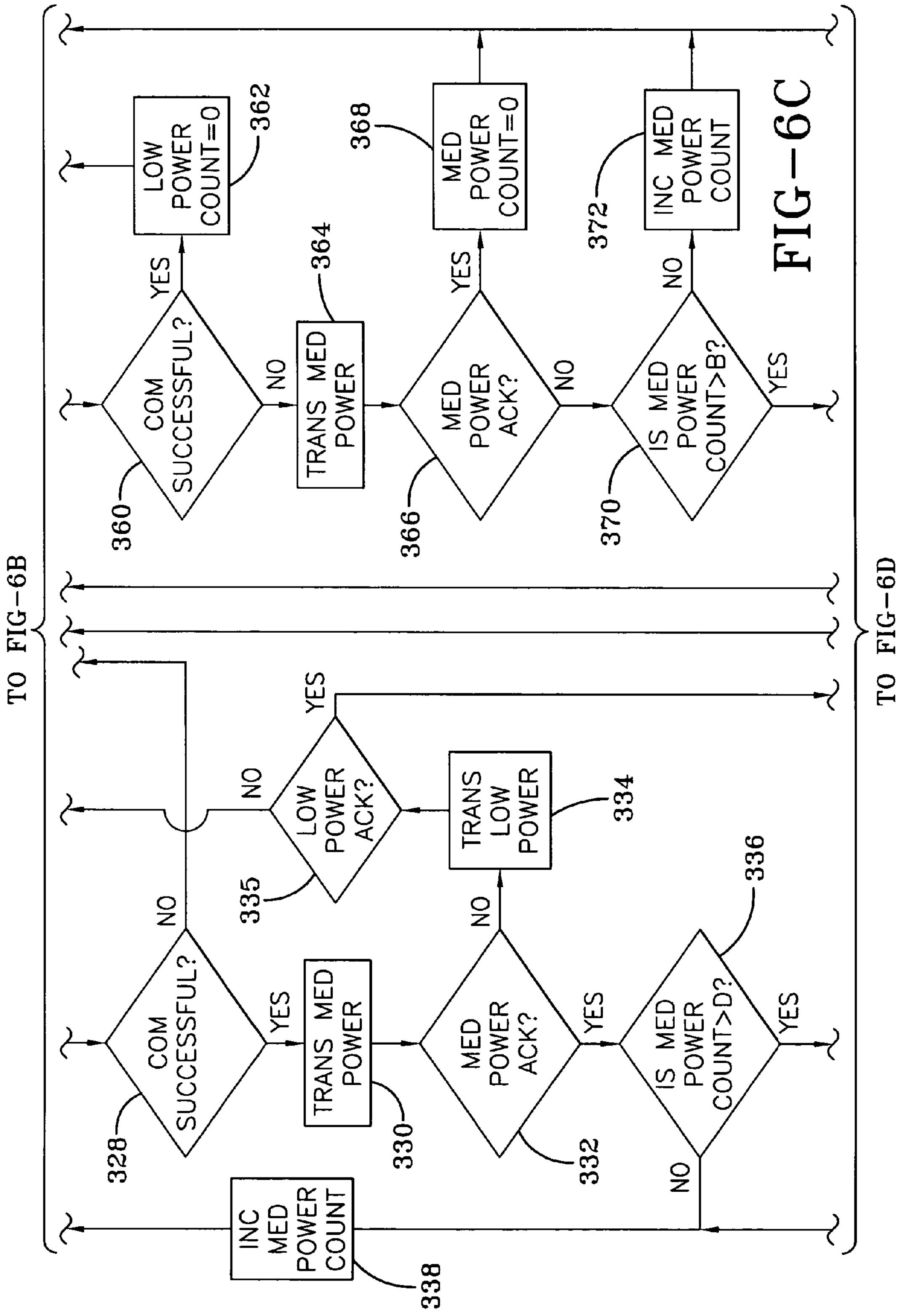
Figure 6D:
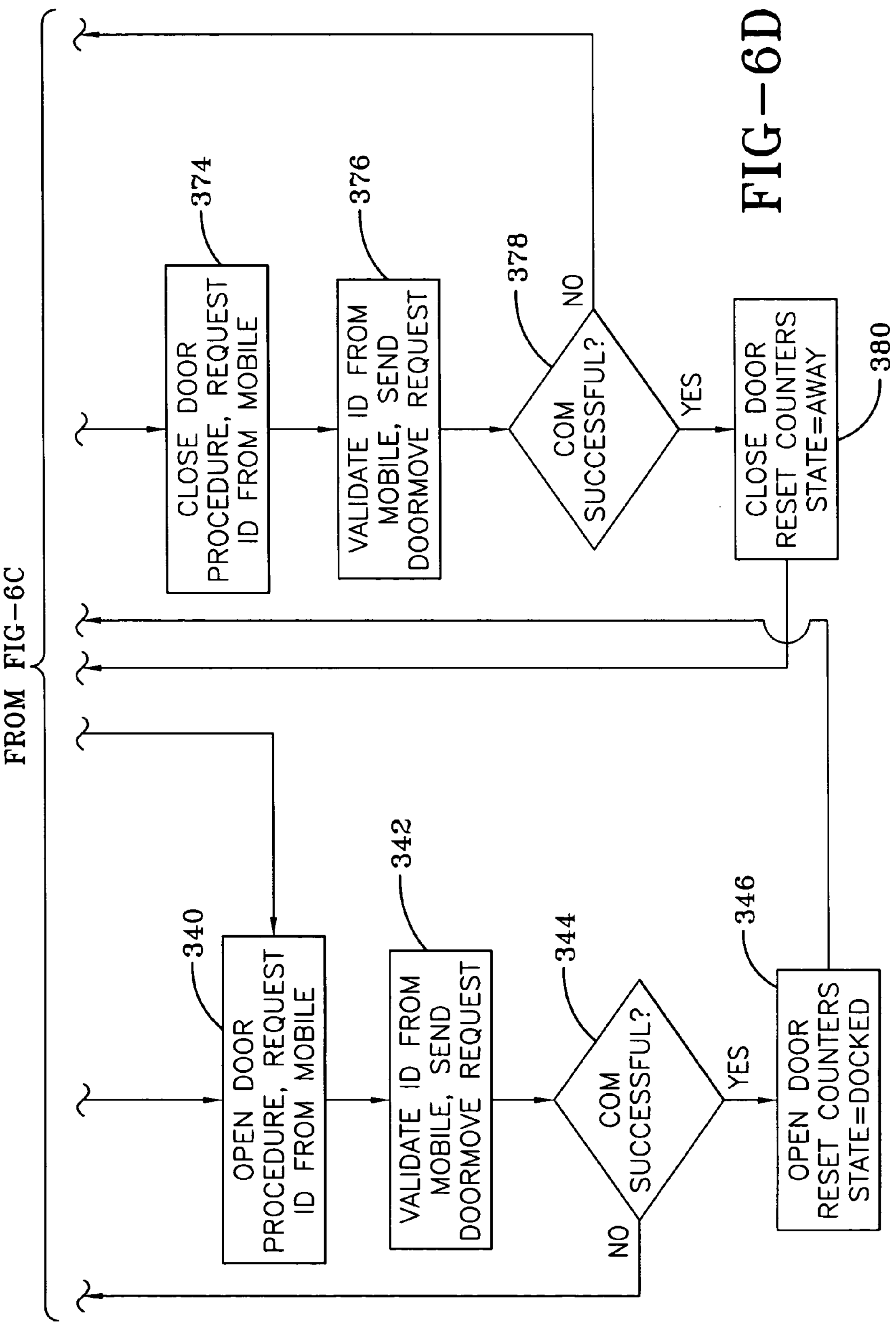

Referring now to FIGS. 5A and 5B, the process steps for operation of the system 10 after it has been properly programmed is designated generally by the numeral 200. At step 202, the process 'starts' upon completion of all the initial programming steps for the operator.

At step 204, the beacon transceiver 56 emits a "dormant" RF or other appropriate signal receivable by the transponder 76. The signal may be at various intervals depending upon the position of the transponder. For example, in a dormant state—where the transponder is positioned far away from the transceiver—a signal may be sent once every five seconds as opposed to 60 times per second in one of the other states. While the controller executes step 204, the controller also monitors the status of the activity sensor 84 at step 206.

At step 208, a determination is made as to the status of the activity sensor and as to whether a corresponding signal is receivable by the controller. If a signal from the activity sensor is not active and receivable by the controller then the process continues to step 210. At step 210 if the transponder contained within the proximity device receives the dormant signal it will in turn generate a return signal and the process will continue to step 229. However, if at step 210, the transponder does not detect the dormant signal emitted at step 204 and therefore does not emit a return signal then the process returns to step 204. At step 210, once a signal is received and confirmed by the transponder, the RF signals communicated between the transceiver and the transponder may increase from once every five seconds to 60 times per second and is thus no longer considered dormant. In the preferred embodiment it is believed that the frequency of communications will increase once an energization signal is successfully communicated between the transponder and the controller. As the transceiver receives the series of radio frequency signals, the controller 52 checks the amplitude of each identical coded RF signal and determines whether these signals are becoming greater or lesser in signal strength magnitude. In other words, the controller is continually determining whether the transponder's signal strength is increasing, decreasing or staying the same. As such, the controller 52 may use the amplitude, frequency, the return time, or all three, associated with the signals 130-136 to determine the profile of the transponder approaching the transceiver.

Returning to step 208, if the controller does detect a signal generated by the engine sensor then the process proceeds to step 218. As noted previously, in addition to monitoring the signals of the transponder, the controller 54 may also monitor the activity sensor 84 that is carried by the proximity device 70. Accordingly, at step 208, the activity sensor 84 determines whether the device carrying the transponder is in an energized state. For example, if the device carrying the transponder 76 is an automobile, the engine sensor 84 may monitor the ignition switch to determine whether the engine is active or not. For an electric device, such as a golf cart or other moving vehicle powered by a fuel cell electric battery or the like, other sensors may be employed inasmuch as the carrying device may have a communication device that actuates the sensor carried by the proximity device. Or the sensor may be able to detect engine vibration associated with the carrying device. In any event, at step 208, if the sensor 84 determines that the carrying device 108 is energized then, at step 218, if the proximity device has only been dormant for a period of time less than a predetermined period of time, then the process proceeds to step 229. This step is taken for when the carrying device has only recently been active and the controller cannot, at the present time, determine a clear intention or direction of movement of the carrying device. However, if it is determined that the transponder has been dormant for a predetermined period of time and the ignition has been turned on, then the transponder continues to step 220 and the controller determines whether a signal is being received from the transponder. If a signal has not been received from the transponder by the transceiver then the process continues to step 230. This scenario applies when the proximity device detects the turning on of the proximity device, but the carrying device is out of range of the transceiver.

However, if at step 220 it is determined that a return signal has been received from the transponder then the process continues to step 224 and the controller determines whether the barrier is in an open or closed position. If the barrier is in an open position, the processor proceeds onto step 230, however, if the controller determines that the barrier is in a closed position at step 224 then the barrier will be automatically opened at step 226. In other words, it is envisioned that the barrier will be closed when a person enters their automobile or other mobile device. In order to avoid the step of actuating a wall station open button or other barrier movement device, the user simply turns their automobile ignition on, which will be sensed, at step 208 and if it is confirmed that the barrier is closed the barrier will automatically open at step 226. However, if the carrying device is turned on while in the park position and the barrier is in an open position, the controller will proceed to await further movement of the proximity device before any further action is taken. Upon completion of the open barrier step at 226, the processor proceeds to step 230.

At step 229, once the transponder has awakened from receipt of an initial transceiver signal or the turning on of the carrying device, the transceiver 56 generates and emits a return signal back to the transponder and the controller enters an active state and an appropriate number of signals are communicated between the transponder and the transceiver at a preferred rate higher than the dormant signal.

At step 230, the transceiver and the controller monitors the increased rate of transponder return signals that may be classified as any one of the signals 130-136 so as to establish a profile to determine movement of the transponder with respect to the controller and thus the area enclosed by the barrier. As used herein, a "profile" is representative of a signal or successive signals received by the transceiver from the transponder over a predetermined period of time. From this profile the direction of travel of the carrying device can be determined, and a determination can be made as to whether the direction of travel fits one of the previously learned and stored profiles.

In general, at step 232, the controller compares the received profile from the proximity device to the base profile stored in the controller's memory. If it is determined that the received profile is increasing or decreasing, the process proceeds to determine whether flags for the ground loop detectors have been set at respective steps 234*a* and 234*b*. If the flag has been set at step 174 (See FIG. 4) then the process continues to the respective ground loop confirmation steps 237*a* and 237*b*. If the presence of the carrying device is not confirmed by the respective steps 237*a* and 237*b*, then the process returns to step 230. But if the ground loops or other confirmation-type sensors do confirm the presence of the carrying device, in either a single location or in an expected sequence of locations, then the process continues as if the flag had not been set at step 174. In other words, if the presence of the carrying device is confirmed by the ground loops, then the process continues to step 238 for an increasing profile or to step 260 for a decreasing profile.

At step 238 it has been determined by the controller that the received profile is increasing and that it matches with the stored base profile. Accordingly, the controller determines whether the barrier is in an open or closed position. In other words, the controller has determined that the proximity device is approaching the access barrier. Since this is the case, then if the barrier is open as determined at step 238, no action is taken at step 240 and the carrying device may proceed to enter the enclosure. However, since it is determined that the transponder is approaching, and that the received profile matches the increasing base profile and the barrier is closed, then at step 242 the barrier is opened. Regardless of the actions taken at step 240 or 242, the controller continues to monitor the return signals from the transponder at step 246. At this time, the controller is determining whether the device carrying the transponder is generating a set profile to ascertain whether the transponder has been moved into or within the enclosure bordered by the access barrier. In other words, a person may park their car just outside the enclosure and simply walk into the access area with the barrier being open. However, if the device carrying the transponder moves into the park position 122 this is detected by the controller which compares the park signal 130 to the set profile. If an activity sensor is provided with the proximity device, then the controller at step 249 continually checks the status of the sensor until the carrying device is turned off. Once the engine is turned off and if constant return signal values are obtained from the proximity device, then the controller closes the barrier at step 250. If however, at step 248 it is determined that the received profile is not comparable to the set profile—the carrying device remains outside the enclosure area—then the transponder is instructed to go dormant and await the next command and the processor returns to step 202.

It will be appreciated that the increasing profile requires the proximity device to move from the energization position 126 completely to the action position 124 so as to ensure that an opening event is desired. In other words, if the proximity device passes along the street 116 associated with the driveway 114 an increasing profile would be detected for a period of time but not a sufficient enough period of time to cause the access barrier controller to move the barrier in a desired direction. By requiring confirmation of the increasing profile from the energization position to the action position, the controller 52 can confirm that the proximity device is in fact in a desired position to open the access barrier. This can further be confirmed by use of ground loop detectors as indicated at step 237.

Returning to step 232, if it is determined that the received profile is equivalent to the base profile, a determination is made as to whether the received profile is decreasing or increasing. In the event that the received profile is decreasing, then the processor proceeds to step 234*b*, to determine whether the ground loop detector is connected to the controller.

If not, step 237*b* is bypassed and the process continues at step 260. But if at step 234*b* it is confirmed that the ground loop detector or other vehicle confirmation sensor is operational, then the process continues to step 237*b* to determine whether the carrying device is in fact moving from the action position 114 as detected by the ground loop 120*a* or as detected by the carrying device passing from the action position toward the initial position 120*b* if multiple ground loops are provided. If the carrying device is not moving in the expected direction then the process returns to step 230. In other words, it is determined in this process whether the device carrying the transponder is moving from an action position to an energization position in a predetermined period of time. If it is determined that the received signal is not decreasing in a manner consistent with the stored base profile, then the process returns to step 230. If however at step 260 it is confirmed that the transponder signals are decreasing in an expected manner for an automobile or other device carrying the transponder to be moving away from the access area, then at step 262 the controller determines whether the barrier is in an open position or in a closed position. If the barrier is open then it is presumed that the person is leaving the access area and the barrier is closed at step 264. If however, the barrier is already closed, i.e., presuming that the device carrying the transponder was parked in the action position but the door was previously closed and a decreasing profile is detected, then no action is taken and the door remains closed. The process continues to step 252 and the transponder is allowed to go dormant and the number of signals emitted are significantly reduced.

Returning now to step 232, if it is determined that the return profile is not increasing or decreasing but is constant, then the process continues to step 270. If it is determined at step 270 that the transponder signals are constant for a predetermined period of time then the processor proceeds to step 272 and the transceiver stops receiving signals and the transponder goes dormant at step 252. However, if at step 272 the signals do not remain constant for a predetermined period of time then the processor returns to step 230. This scenario is for when the proximity device is moved within range of the controller but then remains in a stationary position for a predetermined period of time.

In summary, it will be appreciated that the controller 52 may be programmed to determine when the transponder is moving toward or away from the transceiver; when the controller can ignore signals from the proximity device with an amplitude equal to or greater than a preset value to allow the transponder to move a sufficient distant from the transceiver without taking action; or when the transponder may move in proximity—between the active and energization positions—of the transceiver prior to the controller generating a signal to close or open the barrier. If the transponder no longer receives the coded radio frequency signals for a predetermined period of time, then the transponder will go dormant to conserve power. If the transponder receives a predetermined number of the coded RF signals without a change in the amplitude or strength of the signal, the transceiver may discontinue sending the coded RF signals which will also cause the transponder to go dormant. Further, after an actuation of the motor to move the access barrier, the transceiver can send a second coded signal to turn the transponder off or become dormant to await an awakening event such as activity from the engine sensor, actuation of the wall station, or new movement of the carrying device. The transceiver will begin sending the RF signals again when a door activation command is given by the wall station or other remote switch to move the access barrier or when the engine sensor detects that the device has been turned on. Further, the transponder may be powered by a power source on the mobile platform, such as a car battery, and turned off and on by a switch on the mobile platform such as an ignition switch on a motor vehicle. In other words, the transponder can be directly connected to a power supply provided by the automobile and which is also able to directly detect the status of the engine of the device.

Figure 4:
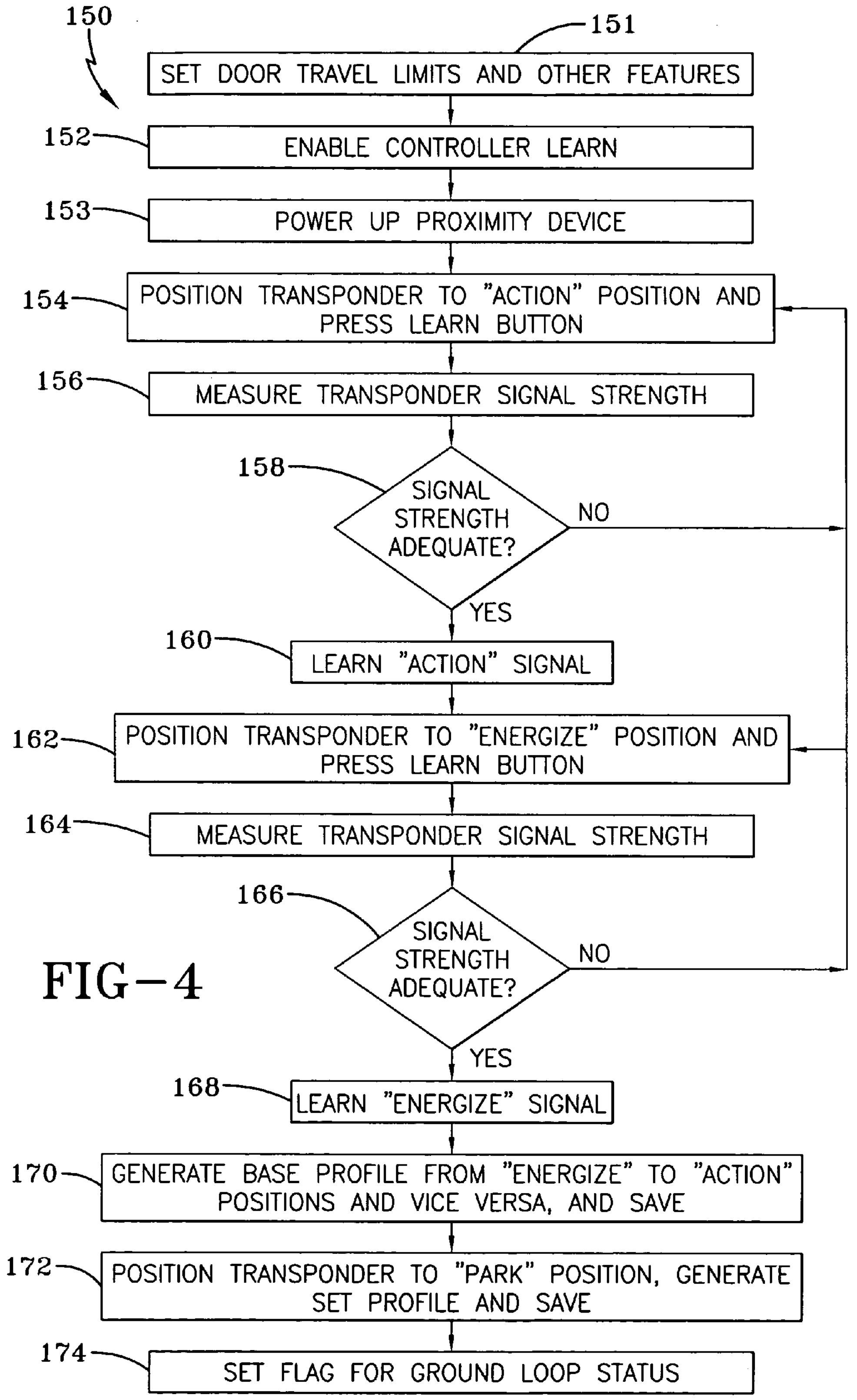
FIG. 4 is an operational flowchart illustrating the programming of a proximity device according to the present invention.

Referring now to FIGS. 6A-D, it will be appreciated that the teachings of the present invention may also provide an alternative embodiment to the operational teachings shown and discussed in regard to FIGS. 4 and 5. The operational flow chart disclosed in FIGS. 6A-D, instead of utilizing the learning of specific positions as to where the proximity device—also referred to as "MOBILE" in the drawings—triggers movement of the door utilizes a serious of different power level signals. Accordingly, by emitting a series of high, medium, low, or any other varying levels of power from the beacon transceiver to the mobile proximity device, which responds in turn, it will be appreciated that a position of the vehicle carrying the proximity device and its direction of travel can be determined. And this can be done in a manner that provides the necessary sensitivity to ensure that the position of the vehicle and the direction of travel of the vehicle is appropriate to initiate opening or closing movements of the access barrier. This embodiment utilizes all or some of the features disclosed in FIGS. 1-3 and may also incorporate selected operational steps discussed in FIGS. 4 and 5. For example, the alternative embodiment may utilize the ground loop or position confirmation detectors if deemed appropriate and may also utilize an activity sensor if desired. In any event, this alternative operational process is designated generally by the numeral 300. This particular variation of the system includes the operator system 34 which is connected to at least one moveable barrier, preferably a garage door, but it is envisioned that the teachings of the present invention may be used for a slidable gate, a residential door, an aircraft hanger door, doors of warehouses and the like.

At first step 302, the controller 52 receives power from either a battery or a residential power source or the like. Likewise, power is supplied to the device 70. At step 304, the controller 52 scans for the lowest noise frequency, as in the previous embodiment, and selects one which allows for operation of the proximity device on the best suited frequency. At step 306 the controller 52 queries the memory device 54 to determine whether a proximity device 70, as identified by an appropriate serial number or the like, is stored in the memory device 54. If not, the controller 52 enters a sleep mode at step 307.

The controller 52 remains in a sleep mode until awakened by a button interrupt step 308. In other words, the controller 52 remains in a reduced power state until the program button 43 provided by a wall station 42 is actuated. It will be appreciated that other sequences of button depressions such as from the keypad transmitter 44 or from the remote transmitter 40 may enable the controller 52 to enter a learn mode. In any event, upon actuation of the program button 43 communications between the proximity device 70 and the controller 52 are initiated. Accordingly, identification numbers are exchanged between the proximity device 70 and the controller 52 and a selected frequency is saved in the appropriate memory devices 54 and 74. Once a proximity device is learned it will be initialized to a "docked" state. If a proximity device has been previously learned to the controller, then on power-up of the beacon transceiver 56, the controller will load the proximity last state—either docked or away—that the proximity device was in. It will be appreciated that the proximity device's identification, the selected frequency, and the state are saved in non-volatile memory 54 so if there is a power interruption, the controller reloads the stored values on return of power. Subsequently, at step 310 various variable values A, B, C and D are selected and stored to set the sensitivity of the operator system. Variations of the variable values may be employed to control how quickly or how slowly the controller reacts depending upon the position of the proximity device with respect to the controller and/or the direction of travel of the proximity device with respect to the controller. In any event, upon completion of step 310, the process returns to step 306 wherein the inquiry as to whether a mobile device is stored in memory is answered in the positive and the process proceeds to step 312. At step 312, the mobile proximity device 70 is considered to be in the docked state which means that the proximity device is in relatively close proximity to the controller and is believed to be positioned within the enclosed area 110. In any event, this concludes the initial programming steps and the process proceeds to step 314 wherein the operational steps follow. However, it will be appreciated that actuation of the program button 43 automatically returns the device to the initial programming steps so as to allow for re-programming of the proximity device 70 or to allow for additional proximity devices to be associated with a single or multiple controller 52. And it will be appreciated that in this embodiment that the learn button 82 on the proximity device is not utilized in a learning or programming mode. However, the button 82 may be used in much the same manner as a known remote transmitter to control operation of the access barrier and override a door movement sequence.

In the docked state, the proximity device is believed to be within the park position. The away state is considered to be away from or out of range of the proximity device with respect to the controller 52. These two states initiate different operational steps in order to determine whether the vehicle is approaching the barrier or whether the vehicle is leaving the area enclosed by the barrier.

If at step 314 it is determined that an away state is in the memory device 54 then the process proceeds to step 316 whereupon the controller 52 and the beacon transceiver 56 generate a "high power" signal 57. This high power signal 57 radiates as far as 250 feet and could be further with an appropriate device. In any event, at step 318 the controller 52 waits to receive a return or acknowledge signal 78 from the proximity device. If an acknowledge signal 78 is not received the communication is considered to be unsuccessful. In other words, the proximity device 70 is beyond the high power signal range. It will further be appreciated that the controller always expects the acknowledge signal 78 to be returned. And the proximity device 70 will not return an acknowledge signal if the signal 57 is not from a beacon transceiver 56 that it was learned to. At step 320 a counter, which is maintained by the controller 52, sets a high power count equal to a zero value. The process then returns to step 316 wherein a high power value is emitted again after a predetermined time. If the high power count is equal to zero, then the controller 52 will wait at least one second before generating another high power signal. In this way, battery power of the proximity device can be conserved.

If at step 318 it is determined that a successful communication has taken place—high power signal emitted and acknowledged—then the process proceeds to step 322 wherein the value stored in the high power count is compared to a predetermined variable value C. If the count is not greater than C then the process proceeds to step 324 wherein the high power count value is incremented by a value of one. Following the incrementing step the process returns to step 316 whereupon steps 318 through 322 are repeated. This process loop continues until the high power count is greater than variable value C whereupon the process proceeds to step 326 wherein it is believed that the repeated confirmation of a high power signal being returned indicates that the vehicle is approaching the enclosed area 110. Accordingly, at step 326 a high power signal is once again transmitted. This is done so as to confirm that the proximity device is indeed within range of the controller. If such a communication is unsuccessful, then at step 328 the process returns to step 316 and steps 318-324 are re-executed.

If at step 328 a high power communication is deemed to be successful then the controller 52 at step 330 transmits a "medium power" signal 57. The medium power signal radiates about 150 feet for the purposes disclosed herein. If such a medium power signal is not received and acknowledged by the proximity device 70 at step 332 the controller 52 then transmits a "low power" signal 57 at step 334. If the low power signal is not acknowledged at step 335 then the process returns to step 326. If however, the low power signal is acknowledged at step 335 the process proceeds to step 340 which will be discussed in detail below.

Returning to step 332, if the proximity device 70 confirms or sends an acknowledgement signal that the medium power signal has been accepted, then the process proceeds to step 336. At step 336, the controller queries as to whether a medium power count is greater than a variable designated by the letter D. If not, then at step 338 the medium power count is incremented by one and the process returns to step 326 and steps 328-332 are repeated.

If at step 336 it is determined that the medium power count is greater than the variable D, the process proceeds to step 340. By requiring the count level to be reached this confirms to the controller 52 that the vehicle is within a medium power range for a predetermined period of time. In the alternative, if at step 335 the medium power range is quickly bypassed and a low power signal is detected, which indicates that the vehicle is in very close proximity to the access barrier, then an open door procedure is executed or initiated at step 340.

At step 340, the controller 52 inquires as to the identification of the proximity device 70. At step 342 if it is determined that the identification of the proximity device corresponds to that stored in the memory device 54 at step 344 then a door remove request is initiated by the controller 52 to the motor 60 which in turn moves the drive shaft 36 and begins opening movement of the access barrier at step 346. If the validation step 342 is not successful, as indicated at step 344, then the process returns to step 338 and ultimately to step 326 to re-initiate steps 328-342. Upon completion of the door opening, the counters C and D are reset to a predetermined, presumably zero value. Additionally, at step 346 the memory state of the mobile device is changed from AWAY to DOCKED. Upon completion of step 346 the processor controller to step 350 for execution of the steps associated for when the proximity device 70 is considered to be in a docked or parked condition.

At step 350, with the controller memory indicating that the proximity device is in a docked state, the transceiver 56 emits a low power signal 57. If the low power signal is received and an acknowledge signal generated then at step 354 a low power count is set to a zero value. However, if at step 352 it is determined that the communication of a low power signal is not successful then the process proceeds to step 356. In other words, it is envisioned that the proximity device is moving from a low range area to a medium power range area. In any event, at step 356 if a lowpower count is not greater than a variable A then at step 357 the lowpower count is incremented by one and the process returns to step 350. If however, at step 356 it is determined that the lowpower count is greater than A, then the process proceeds to step 358 wherein it is envisioned that the vehicle is confirmed to be moving away from the enclosure or garage. Accordingly, at step 358 the confirming signal is sent at low power and if that communication is successful at step 360 then at step 362 the lowpower counter is reset to zero value and steps 350-357 are re-executed. This indicates that the vehicle, although likely moving away from the enclosure has not moved completely away. If however, at step 360 it is determined that the low power signal 57 is not returned, then the controller 52, through the beacon transceiver 56 emits a medium power signal 57 at step 364. Following this, the controller awaits for receipt of an acknowledgement signal at step 366. If acknowledgement signal is received then a medium power count is set to zero at step 368 and the process returns to step 358.

If however, at step 366 a return signal is not generated subsequent to the actuation of a medium power signal then the process proceeds to step 370 whereupon the controller determines whether the medium power count is greater than a variable designated generally by the numeral B. If this count or variable value B has not yet been reached then at step 372 the medium power count is incremented by 1 and steps 358-366 are repeated.

If at step 370 the medium power count is greater than B, which means the vehicle is determined to be outside the medium power range, then at step 374 the close door procedure is initiated. Included in this step is a request for identification from the controller to the proximity device which is then returned to the controller 52. If the controller validates the coded identification sent from the proximity device 70 at step 376 then a door move request is sent. If this request is acknowledged at step 378, then the controller 52 generates a signal to the motor 60 for turning the drive shaft 36 and the controller proceeds to close the door wherein it is envisioned that this step is taken when the proximity device has traveled from the low to the medium range of the controller and as such the door is instructed to close. If however, at step 378 such a validation is not successful then the process returns to step 358 for re-execution of steps 360-376. If however, at step 378 it is determined that the validation request is successful then at step 380 the door is closed, the counters are reset and the state of the proximity device is changed from DOCKED to AWAY and the process returns to step 316.

This particular embodiment is advantageous in that the learning procedure is much simplified inasmuch as only a single actuation of the program button 43 is required and wherein the direction of travel of the proximity device is determined by transmitting at least two and more likely three different power signal levels which may or may not be returned by the proximity device so as to determine its direction of travel with respect to the beacon transceiver and as such the controller 52. It will further be appreciated that by adjusting the variables A, B, C and D, various sensitivity levels can be set. In other words, by selecting the number of times the medium power or lower power signals are acknowledged, the time between opening and closing the doors can be minimized or maximized depending upon the length of the driveway or access area and also depending upon the interference that may be caused by corresponding devices. Yet another advantage of this embodiment is that the design triggers a door open from a transition from a high power range to a medium power range, and the controller triggers a door close from a transition from a low power range to a medium power range. This prevents a situation where one could find a spot where the RF signal is intermittent and with out moving the mobile carrying device could cause the door to oscillate between positions. To prevent this from happening the setting at variables B and D are critical.

Figure 2:
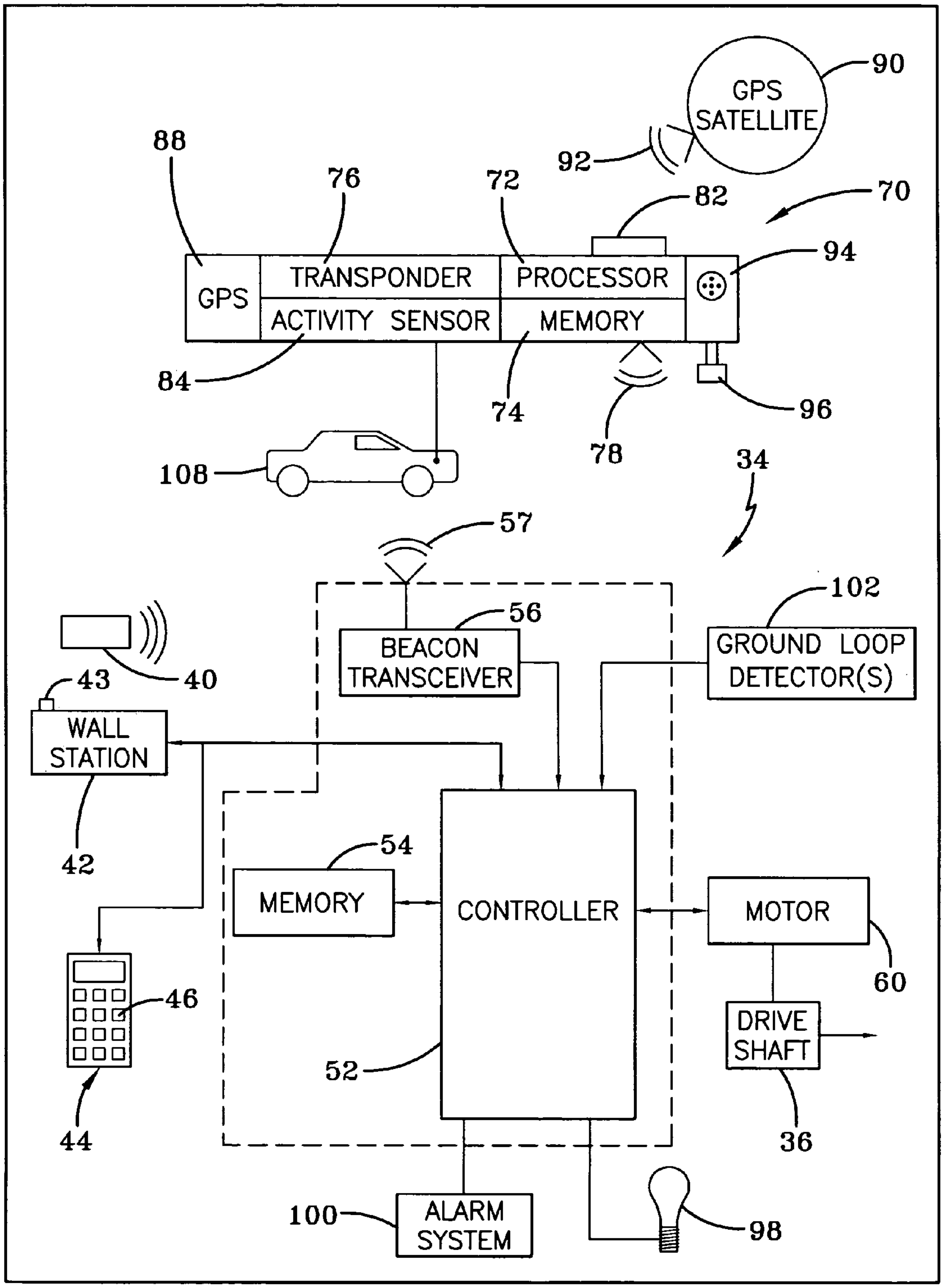
FIG. 2 is a block diagram of an operator system according to the present invention.
Figure 7:
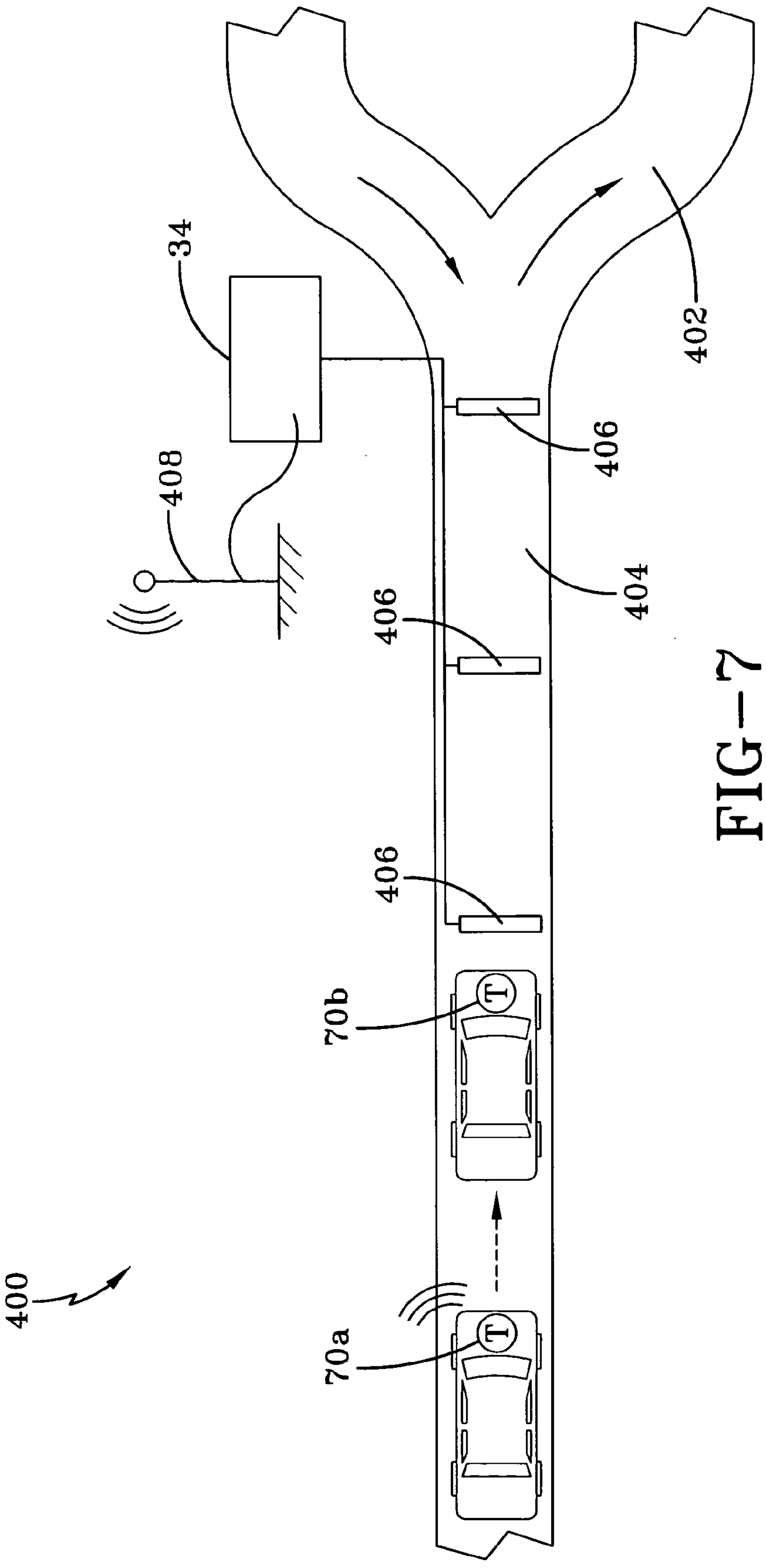
FIG. 7 is a schematic diagram of various positions of an exemplary carrying device with respect to at least one access barrier on a unidirectional passageway that utilizes the operator system according to the present invention.

Referring to now to FIG. 7 and FIG. 2, it will be appreciated that the teachings of the present invention may also be used to control traffic along a one-way road. This system is designated generally by the numeral 400 in FIG. 7 wherein a two lane road 402 converges into a single lane road 404 which only permits one-way traffic. The system includes the operator system 34 which is connected to at least one movable barrier, preferably a gate, and preferably multiple barriers 406. Coupled to the operator system 34 is a parabolic antenna 408 which is used to communicate with the transponders or proximity devices 70. In this manner, the transponder communicates with the controller or operator system 34 via the antenna 408. And the operator system can detect whether the devices carrying the transponders are moving in an appropriate direction. In the event that it is determined that the transponder signals are increasing in strength when they should be decreasing then an appropriate remedy can be taken by erecting the barriers 406 and/or generating stop signals or other means to instruct the person driving the automobile carrying the proximity device to stop and reverse direction. Alternatively, the audio or lighting devices 94, 96 carried by the proximity device could generate an appropriate warning. Such a system is envisioned being used at piers or narrow access roads to ensure that people traveling in one direction do not travel in the opposite direction at a later time when it is not deemed appropriate.

Figure 8:
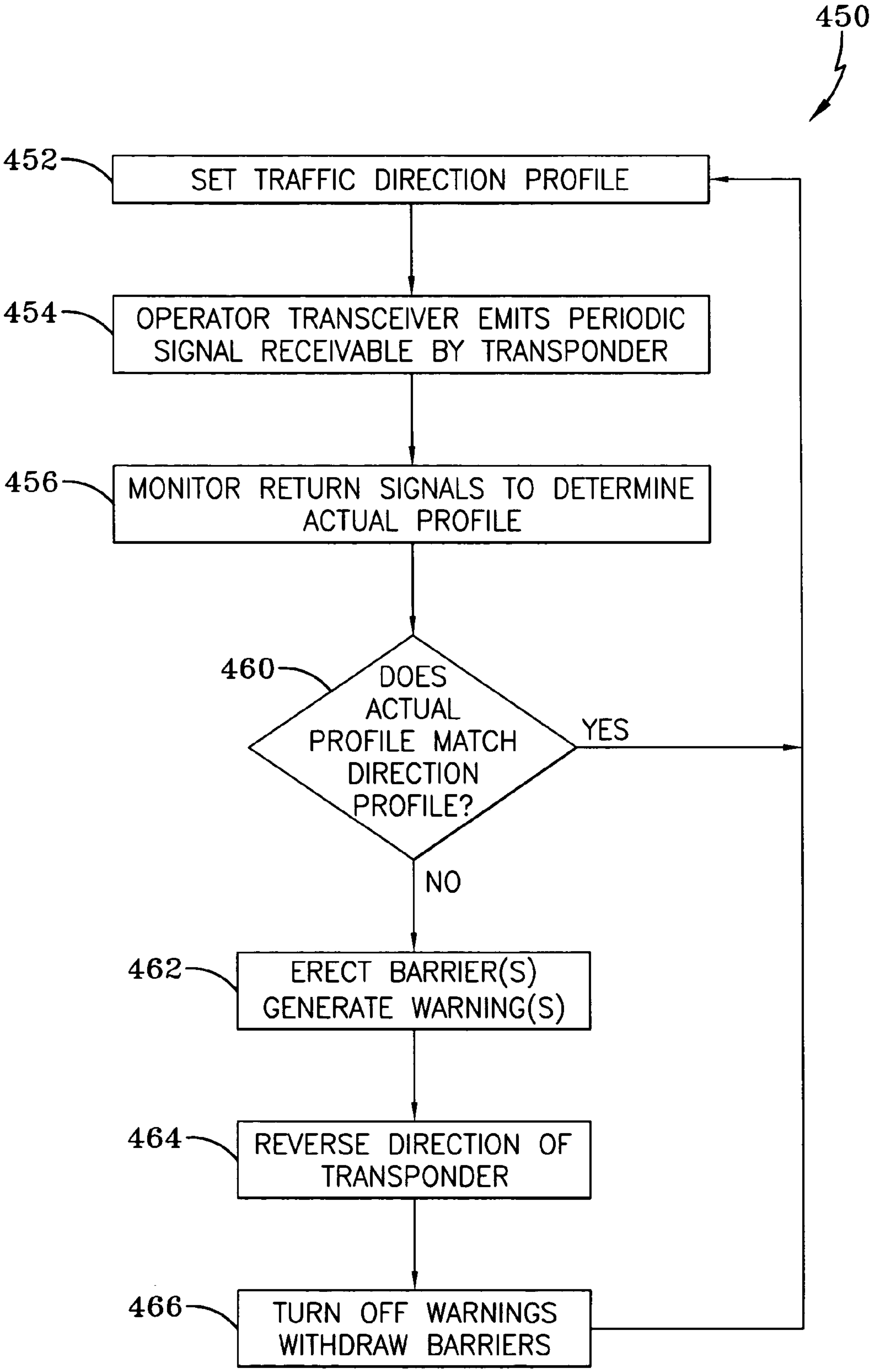
FIG. 8 is an operational flowchart for illustrating use of the operator system and proximity devices with a unidirectional traffic flow system.

Referring now to FIG. 8, an operational flowchart designated generally by the numeral 450 sets forth the procedure for implementing the system 400. At step 452 a traffic direction profile is set and stored in the memory device 54. At step 454, the operator transceiver 56 emits a periodic direction beacon signal 57 that is receivable by the transponder 76. Following this, at step 456, the controller monitors the return signal 78 to determine an actual profile of one or more transponders. It will be appreciated that the controller is able to generate and receive signals from multiple transponders without interference therebetween. At step 460, the controller determines whether the actual profile matches the directional profile set in step 452, and if so, then the processor returns to step 452. However, if at step 460 it is determined that the actual received profile does not match the direction or base profile set at step 462, then the controller instructs the barriers to be positioned or closed such that traffic flow along the length of the one-way road is prohibited. Accordingly, if at step 464 the direction of the transponders is reversed then at step 466 the warnings are turned off and the barriers are withdrawn. The processor then proceeds to step 452 and the process is repeated.

It is envisioned that the actual profiles are established based upon the strength of the return signals in much the same manner as the embodiment discussed in FIGS. 3-5. But it is also envisioned that the beacon transceiver could emit different power level signals as disclosed in FIGS. 6A-D and, based upon the corresponding return signals, allow for control of the barriers.

It will be appreciated that an alarm system may be contained within the vehicle or activate warning lights along the roadway or activate a barrier to prevent the vehicle from entering the area. The parabolic antenna 408 allows the transceiver to communicate with the transponder in the vehicle that is traveling in the wrong direction. In other words, if a vehicle is traveling in the lane in the correct direction it may proceed along the one-way road; however, it is also envisioned that warnings may be sent to those vehicles traveling in the correct direction when another vehicle is detected traveling in the wrong direction. As such, the person traveling in the correct direction may take corrective action by slowing down and/or flashing their lights.

Figure 9:
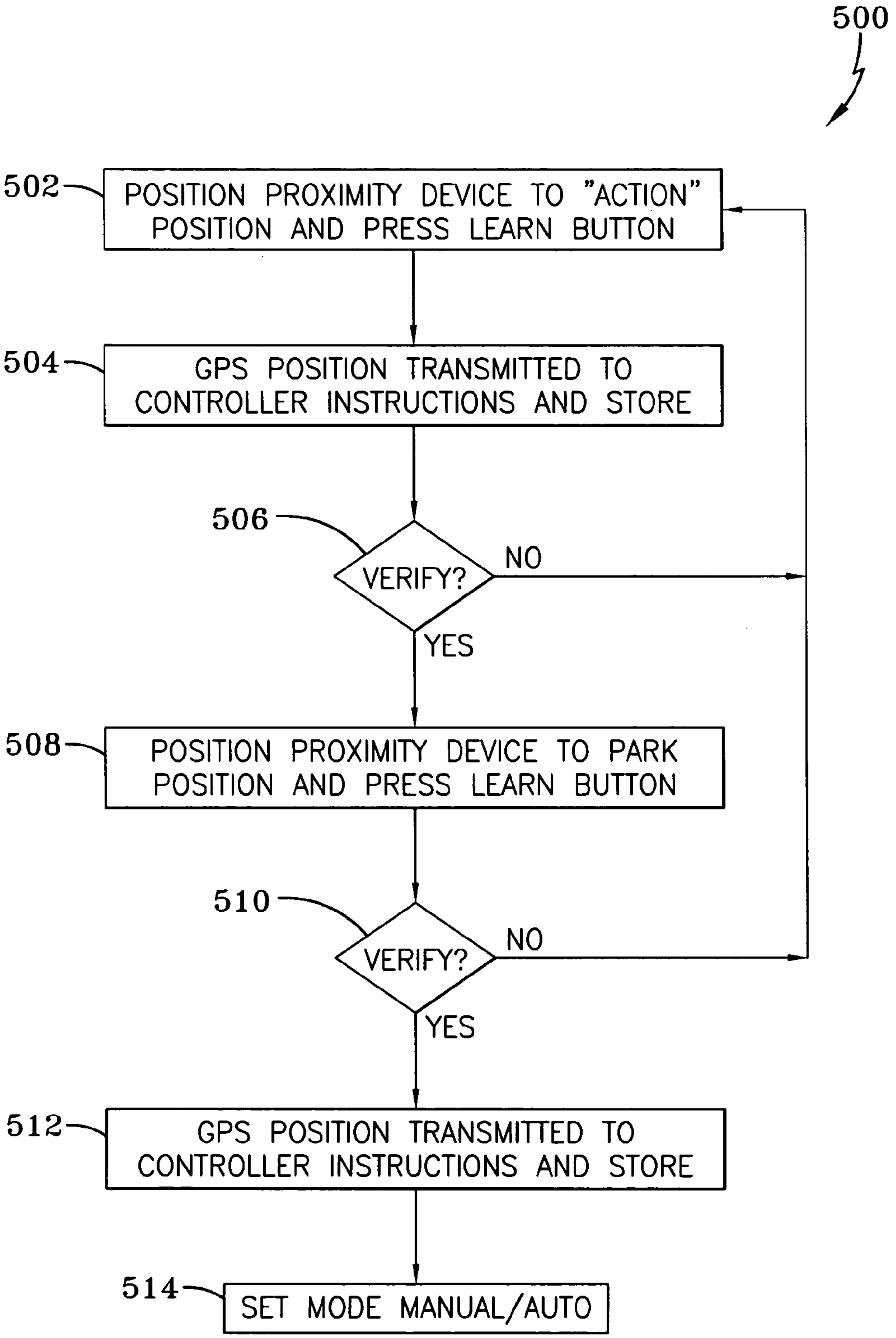
FIG. 9 is an operational flowchart illustrating the programming of a global positioning proximity device to the operator system.

Referring now to FIG. 9, it can be seen that an operational flowchart designated generally by the numeral 500 sets forth the procedure for learning a global positioning system for the purpose of hands-free operation of an access barrier. At step 502 the proximity device 70 is positioned to the action position and the learn button 82 is pressed. This allows for the proximity device to determine the GPS coordinates of the action position and this information is then processed by the proximity device and stored accordingly. At step 504, the GPS coordinate position is transmitted from the device 70 to the controller 54 and stored along with a corresponding instruction set. At step 506 the controller attempts to verify the device's position and if not verified then the processor returns to step 502. If verified, the controller proceeds to step 508 where the proximity device is positioned at a park position and the learn button 82 is pressed once again. This position is then checked at step 510 and if verified the processor proceeds to step 512. If not, then the processor returns to step 502. At step 512, the global positioning system coordinates of the park position are transmitted to the controller and stored along with the appropriate instruction set. The instruction set may be selected by the programmer so that after completion of the programming steps a predetermined action is performed whenever the proximity device arrives at one of the programmed locations. Finally, at step 514 a manual or an automatic mode is set for the proximity device. If in a manual mode, the proximity device allows for the proximity device to only work when it is in the learned GPS coordinates. In other words, if the carrying device is placed in the action position then the transmitter is allowed to operate as a customary remote transmitter and actuation of the button 82 results in opening or closing of the barrier. However, if the proximity device is not in the action position when the transmitter is operated then the controller will not recognize the system. In this way, the combination of the GPS system and the transponders may be used as a key. However, the mode may also be set to an automatic mode such that if the automobile or other device carrying the transponder is placed in an appropriate position then the barrier is automatically moved in the appropriate direction depending upon the carrying device's detected position.

Figure 10A:
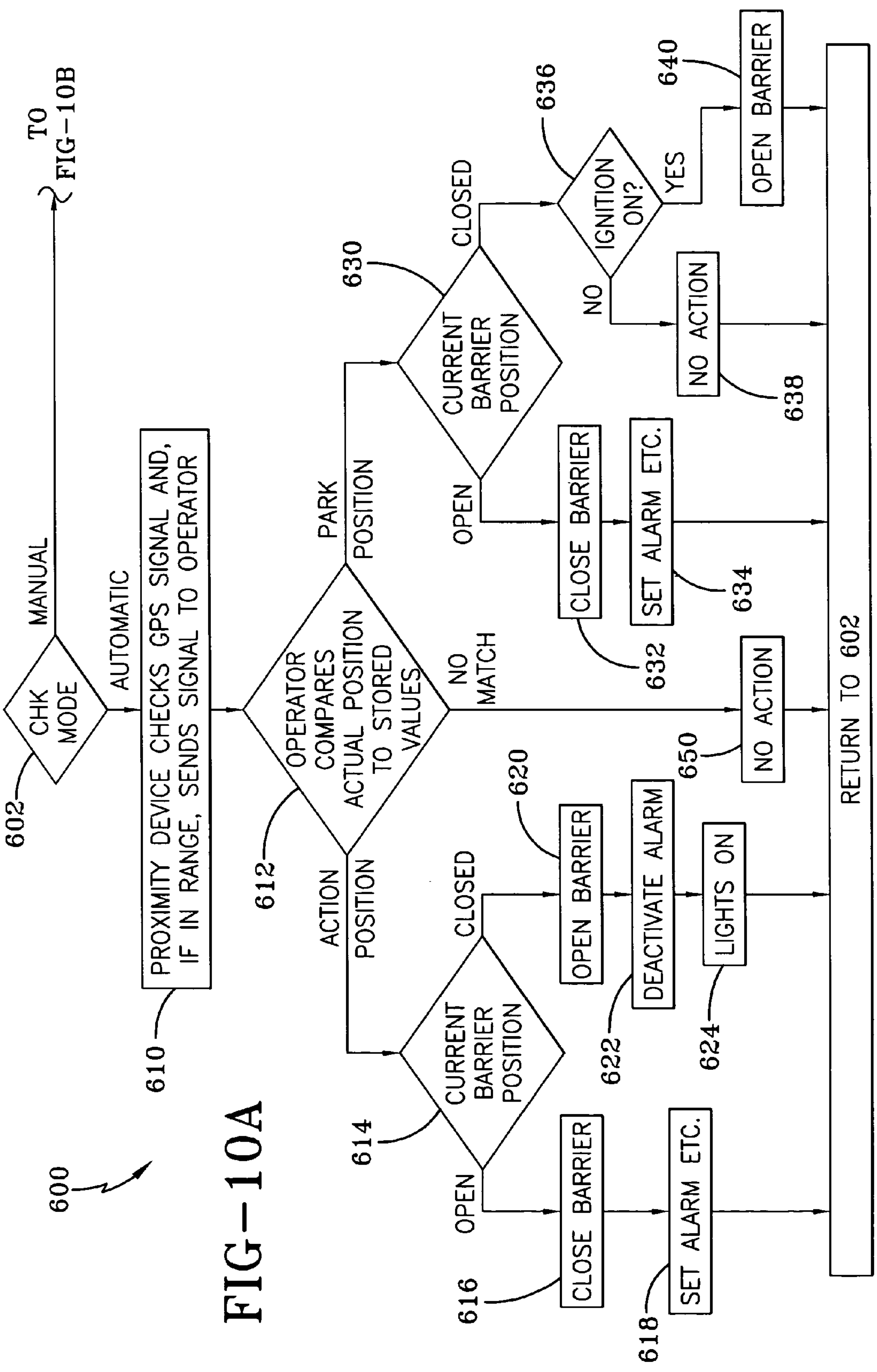
FIGS. 10A & 10B present an operational flowcharts illustrating use of the global positioning proximity device with the operator system according to the present invention.
Figure 10B:
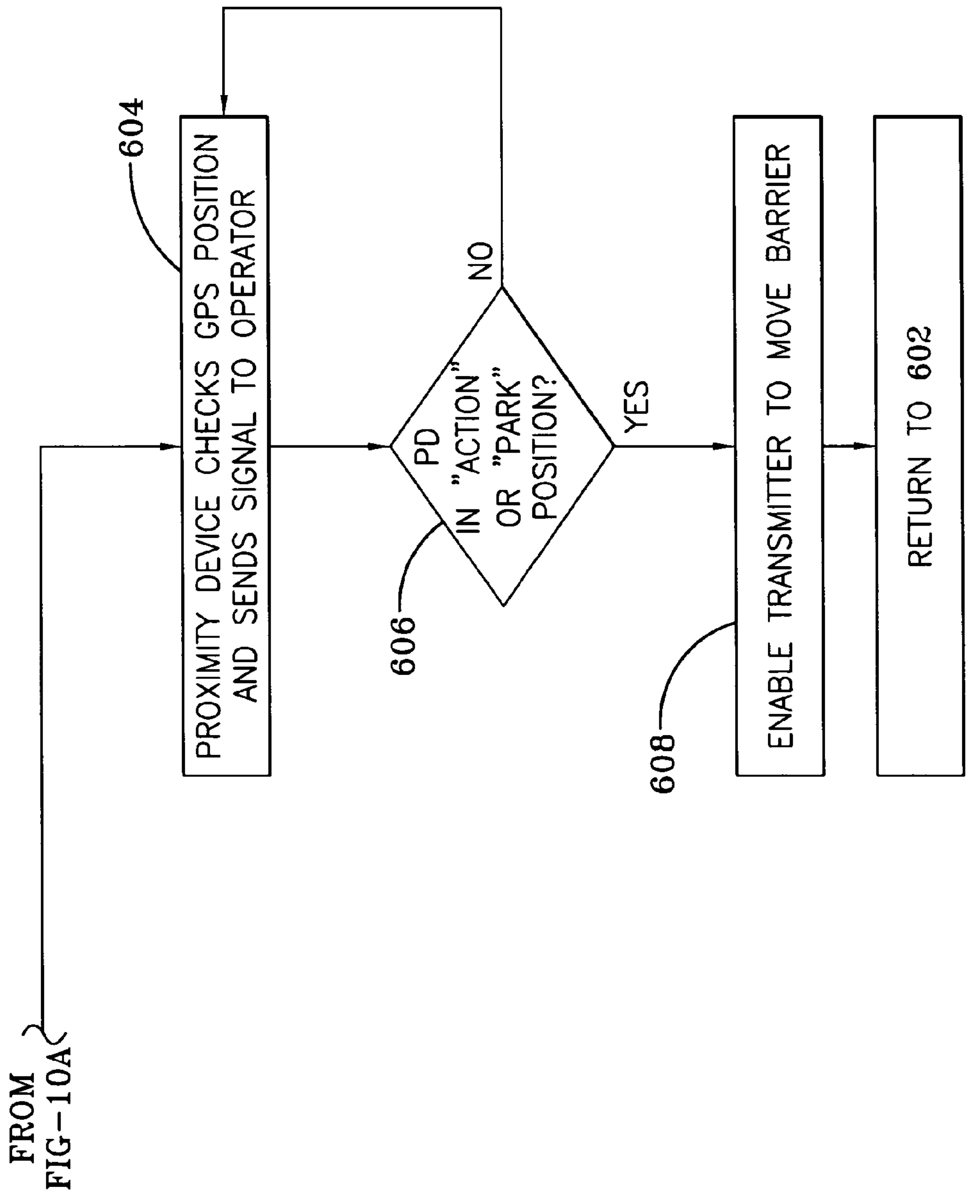

Referring now to FIGS. 10A and B the system's implementation of the GPS signals is disclosed and shown by a flowchart designated generally by the numeral 600. At step 602, the mode—manual or automatic—of the proximity device is checked. If it is determined that the device is in the manual mode then the process continues to step 604 and the proximity device checks the GPS position, at step 606, and sends a position signal to the controller 54. If the proximity device is in either the action position or in the park position then the controller proceeds to step 608; however, if the proximity device is not in either the action or park position, the processor returns to step 602. If the device is in either one of the action or park positions the proximity device is enabled at step 608 to move the barrier and the person associated with the transmitter may press the button 82 to actuate the controller and move the barrier. This provides a security feature inasmuch as two conditions must be met before the access barrier can be moved. Upon completion of step 608 the process returns to step 602.

If at step 602 it is determined that the device is in the automatic mode then the processor proceeds to step 610. At step 610, the proximity device 70 transmits the GPS position signal to the controller as long as the proximity device is within an appropriate range for receiving signals from the transceiver. Once the device is out of a predetermined range of the programmed park and action position signals then no signal is sent to the controller until an acceptable range is reached. If the predetermined range is reached, then at step 612 the operator compares the actual position to the stored values. If the proximity device is determined to be in an action position then the controller at step 614 determines what position the barrier is in. If the barrier is open, then at step 616 the barrier is automatically closed. Appropriate signals are then sent to the controller to set an alarm, if provided, and after a predetermined period of time and the process returns to step 602. If however, at step 614 it is determined that the barrier is closed, then the controller, at step 620, opens the barrier and, if desired, all the appropriate alarms are deactivated and the lights are turned on at steps 622 and 624, respectively. The process then returns to step 602.

At step 612, if it is determined by the operator that the GPS value of the proximity device is substantially equivalent to the GPS coordinates of the park position, then the current barrier position is determined at step 630. If it is determined that the barrier is open, then at step 632 the barrier is closed and the alarms are set at step 634. If however, at step 630, it is determined that the barrier is closed then the proximity device 70 determines whether the ignition is on or the device is operating by virtue of the sensor 84 at step 636. If it is determined that the carrying device is not on, then no action is taken at step 638 and the processor returns to step 602. However, if the carrying device is on then the barrier is opened at step 640. This is done so that the barrier is never closed while the ignition is running so as to prevent the accumulation of harmful carbon monoxide. It will be appreciated that a predetermined delay may be observed by the controller immediately after the barrier is opened or closed. This delay is used to allow the drive of the carrying device to move between the action and park positions without re-initiating movement of the barrier. It will also be appreciated that the controller may require movement from the action position before allowing another cycle of barrier movement. Of course other operational features disclosed in the other embodiments may be disclosed in the present embodiment.

The advantages of the present invention are readily apparent. In particular, it is believed that the energy requirement for the proximity device is very low thus enhancing battery life and significantly reducing the need to replace batteries. Alternatively, the proximity device could be directly connected to the power supply of the carrying device and utilizing the batteries for back-up or emergency power. It is also believed that this embodiment is less expensive than other hands-free devices by not requiring the need for additional antennas, analyzers and transmitters. The invention is also advantageous inasmuch as the consumer simply holds the button of the proximity device for a period of time to learn the transponder to the transceiver and then places the transponder in the glove box for "hands-free" operation. If the need arises for a conventional activation of the access barrier, one press of the button allows the transmitting device to function as a conventional remote transmitter. Further, the present invention can be utilized to provide a portable key to the garage door whereas with other systems this is not possible. In other words, in addition to the device operating as a hands-off device, confirmation of the presence of the proximity device in an appropriate carrying device utilizing ground loop detectors can provide a security confirmation not present in currently known systems.

By incorporating the GPS features into the present invention it will be appreciated that the proximity device could be used specifically for activating or deactivating controller-based devices such as garage and gate operators, security light, security systems and related devices. Such a device also prevents accidental activation of the devices inasmuch as the barrier can only be activated by remote signal when the transponder is in the correct or previously stored GPS location. The automatic feature of the foregoing device allows for hands-off activation of predetermined devices as the vehicle approaches or departs from the home, office or other location. It will further be appreciated that the foregoing technology may be implemented to provide a validation procedure using "rolling code" technology.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby.

Accordingly, for an appreciation of the true scope and breadth of the invention, reference should be made to the following claims.

What is claimed is:

1. An operator system for automatically controlling access barriers, comprising:

a controller associated with at least one access barrier;

at least one beacon transceiver associated with said controller for transmitting and receiving operational signals; and at least one proximity device comprising a processor and a transponder in communication with said controller via said transceiver, said transponder communicating operational signals with said beacon transceiver based upon a position of said proximity device with respect to said beacon transceiver, wherein said controller is programmed to identify said proximity device, and wherein said beacon transceiver periodically emits a beacon signal having at least two power level signals, each said power level signal having an effective range, and each said power level signal emitted in a predetermined sequence to determine a position state of said transponder and wherein said controller monitors a number of said operational signals returned from said transponder at the at least two power levels and changes said power level signal based upon said number of said operational signals returned so as to control the position of said access barrier based upon a change in said position state and the position of said access barrier.

2. The operator system according to claim 1, wherein said controller is associated with a program button, wherein actuation of said program button prepares said controller for a learn phase for receipt of initial operational signals from said at least one proximity device.

3. The operator system according to claim 2, wherein said proximity device further comprises:

a learn button connected to said processor wherein said proximity device is placed in an action position so that said controller learns an action signal upon actuation of said learn button during said learn phase;

wherein said proximity device is placed in an energization position so that said controller learns an energization signal upon actuation of said learn button during said learn phase; and wherein said controller generates a base profile from the respective strengths of said action and said energization signals.

4. The operator system according to claim 3, wherein said transponder periodically generates a transponder signal, after completion of said learn phase, such that said controller begins generation of a monitored profile when said transponder signal is substantially equivalent to one of said energization signal and said action signal, and wherein said controller moves said access barrier if said monitored profile matches said base profile.

5. The operator system according to claim 4, wherein if said monitored profile that matches said base profile is decreasing, said controller opens said access barrier.

6. The operator system according to claim 4 wherein if said monitored profile that matches said base profile is increasing, said controller closes said access barrier.

7. The operator system according to claim 3, wherein said controller generates a monitored profile from said action and energization signals, and wherein said controller, after completion of said learn phase, allows said access barrier to remain in position if said monitored profile does not match said base profile.

8. The operator system according to claim 1, wherein said proximity device further comprises:

a learn button connected to said processor wherein said proximity device is placed in a park position so that said controller learns a park signal upon actuation of said learn button during said learn phase; and wherein said controller generates a set profile from said park signal.

9. The operator system according to claim 8, wherein said controller generates a monitored profile from said park signal and wherein said controller closes said access barrier if said monitored profile matches said set profile.

10. The operator system according to claim 2, wherein said proximity device is placed within range of said beacon transceiver so that said controller learns said transponder's identity upon actuation of said program button during said learn phase.

11. The operator system according to claim 10, wherein said transponder generates an acknowledge signal upon receipt of said beacon signal, said acknowledge signal is detectable by said beacon transceiver and wherein said controller includes a memory device that stores a position state corresponding to whether said acknowledge signal is received by said beacon transceiver within a predetermined period of time.

12. The operator system according to claim 11, wherein said position state is designated as one of AWAY and DOCKED depending upon return of said acknowledge signal and said beacon signal's power level.

13. The operator according to claim 12, wherein said controller moves said access barrier depending upon return of said acknowledge signal.

14. The operator system according to claim 1, wherein said beacon signal has three different power levels designated as high, medium, and low.

15. The operator according to claim 14, wherein said controller moves said access barrier upon detection of a change in said beacon signal's power level.

16. The operator system according to claim 14, wherein said proximity device is in an AWAY position state if said beacon transceiver does not receive an acknowledge signal from said transponder when said high power level signal is generated by said beacon transceiver.

17. The operator system according to claim 16, wherein said beacon signal is emitted at said LOW power level upon a change from said AWAY position state to said DOCKED position state, and wherein said beacon signal is emitted at said HIGH power level upon a change from said DOCKED position state to said AWAY position state.

18. The operator according to claim 17, wherein said beacon signal is repeatedly emitted by said beacon transceiver until a predetermined number of said low power signals are not acknowledged.

19. The operator according to claim 18, wherein said beacon signal is repeatedly emitted by said beacon transceiver until a predetermined number of said medium power level signals are not acknowledged.

20. The operator according to claim 19, wherein said controller validates said acknowledge signal from said proximity device and closes said access barrier after said predetermined number of said medium power level signals are not acknowledged.

21. The operator according to claim 17, wherein said beacon signal is repeatedly emitted by said beacon transceiver until a predetermined number of said high power level signals are acknowledged.

22. The operator according to claim 21, wherein said beacon signal is repeatedly emitted by said beacon transceiver until a predetermined number of said medium power level signals are acknowledged, unless one of said medium power level signals is not acknowledged and one of said lower power level signals is acknowledged.

23. The operator according to claim 22, wherein said controller validates said acknowledge signal from said proximity device and opens said access barrier after said predetermined number of said medium power level signals are acknowledged or after said lower power level signal is acknowledged.

24. The operator system according to claim 23, wherein actuation of said learn button, when said proximity device is not in said learn phase, causes said controller to initiate one of movement of said access barrier if not moving, and stopping said access barrier if moving.

25. The operator system according to claim 1, wherein said controller has stored therein at least one direction profile.

26. The operator system according to claim 25, wherein said transponder returns an acknowledge signal whenever said beacon signal is received.

27. The operator system according to claim 26, wherein said controller generates an actual profile based upon return of said acknowledge signals for comparison to said direction profile.

28. The operator system according to claim 27, wherein said controller takes corrective action if said direction profile does not match said actual profile.

29. The operator system according to claim 28, wherein said controller withdraws said corrective action taken if said direction profile matches said actual profile.

30. The operator system according to claim 28, wherein said corrective action includes moving at least one of said access barriers to a blocking position and sending a warning signal to said proximity device which generates a sensory output.

31. The operator system according to claim 28, wherein said corrective action includes said controller sending a warning signal to other said proximity devices.

32. The operator system according to claim 2 further comprising:

- a global positioning sensor carried by said proximity device;
- a learn button carried by said proximity device, wherein a first actuation of said learn button during said learn phase causes transmission of an action position signal generated by said sensor which is received by said beacon transceiver; and
- a memory device connected to said controller, wherein said controller stores said action position in said memory device.

33. The operator system according to claim 32, wherein a second actuation of said learn button during said learn phase when said proximity device is in a different position than at said first actuation, causes transmission of a park position signal generated by said sensor, said controller storing said park position in said memory device.

34. The operator system according to claim 2, further comprising:

- a global positioning sensor carried by said proximity device, said proximity device generating said operational signals; and
- a memory device connected to said controller, said memory device storing an action position and a park position established by said sensor,
- said controller periodically comparing said operational signals to said action position and said park position, and checking a barrier status to determine whether said access barrier should be moved.

35. The operator system according to claim 34, wherein if said controller determines that said proximity device is in one of said park position and said action position, said controller allows movement of said access barrier.

36. The operator system according to claim 34, wherein if said controller determines that said proximity device is in said park position, said controller moves said access barrier from one position to another, and if said controller determines that said proximity device is in said action position, said controller moves said access barrier from one position to another.

37. The operator system according to claim 36, further comprising:

- an ignition status sensor carried by said proximity devices, said ignition sensor generating an ignition-on signal received by said controller, said controller opening said access barrier if said proximity device is in said park position and said ignition-on signal is received.

38. A method for automatically controlling operation of an access barrier, comprising:

- providing an operator controller and an associated transceiver, said transceiver emitting a periodic beacon signal at at least two different power level signals in a predetermined sequence each said power level signal having an effective range, and each said power level signal emitted in a predetermined sequence to determine a positional state of said proximity device;
- providing a proximity device that receives said periodic beacon signal and generates a proximity signal for each said periodic beacon signal received from said transceiver;
- monitoring by said transceiver a number of said proximity signals returned from said proximity device, said controller changing said power level signal based upon said number of proximity signals returned; and
- moving the access barrier in at least one direction in response to a change in said beacon signal's power level.

39. The method according to claim 38, further comprising:

- receiving said proximity signal from different predetermined locations to generate a received profile;
- comparing said received profile to a base profile; and
- moving the access barrier in at least one direction whenever said received profile matches said base profile.

40. The method according to claim 39, further comprising:

- moving the access barrier in a closing direction when said received profile matches a decreasing base profile and the access barrier is in an open position.

41. The method according to claim 39, further comprising:

- moving the access barrier in an opening direction when said received profile matches an increasing base profile and the access barrier is in a closed position.

42. The method according to claim 41 further comprising: comparing said received profile to a set profile; and moving the access barrier in a closing direction when said received profile matches said set profile and the access barrier is in an open position.

43. The method according to claim 39, further comprising:

associating said proximity device with a powered device; monitoring a status of said powered device; comparing said received profile to a set profile; and moving the access barrier in an opening direction if said received profile matches said set profile and said status changes from off to on.

44. The method according to claim 39, further comprising:

- associating said proximity device with a powered device;
- monitoring a status of said powered device;
- comparing said received profile to a set profile; and
- moving the access barrier in a closing direction if said received profile matches said set profile and said status changes from on to off.

45. The method according to claim 38, further comprising:

- activating at least one component upon initiation of said moving step.

46. The method according to claim 45, wherein said at least one component is selected from a group consisting of at least one light, at least one audio/video system, at least one security system, at least one locking device, and at least one heating/air conditioning system.

47. The method according to claim 38, further comprising:

changing said positional state upon completion of access barrier movement.

48. The method according to claim 47, further comprising:

determining whether said positional state is in one of two states.

49. The method according to claim 38, further comprising:

cycling through "vehicle motion" steps depending upon said positional state; and changing said positional state upon successful completion of access barrier movement.

50. The method according to claim 49 further comprising:

cycling through "vehicle approaching" steps if said positional state is AWAY;

emitting one of three different power levels of said periodic beacon signal during said vehicle approaching cycling step, said power levels designated as HIGH, MED and LOW, each said power level having a corresponding range;

initially emitting said HIGH power beacon signal and incrementing a highpower count if said corresponding proximity signal is detected;

emitting said MED power beacon signal if said highpower count reaches a first predetermined amount;

incrementing a MED power count if said corresponding proximity signal is detected and said MED power count has not yet reached a second predetermined amount; and opening said access barrier if said MED power count reaches said second predetermined amount.

51. The method according to claim 50, further comprising:

emitting said LOW power beacon signal if said emission of said MED power beacon signal does not result in said corresponding proximity signal being detected; and opening said access barrier if said emission of said LOW power beacon signal is detected.

52. The method according to claim 50 further comprising:

resetting said count values to zero; and changing said positional state from AWAY to DOCKED.

53. The method according to claim 49, further comprising:

cycling through "vehicle leaving" steps if said positional state is DOCKED;

emitting one of at least two different power levels of said periodic beacon signal during said vehicle leaving cycling step, said power levels designated as MED and LOW, each said power level having a corresponding range;

emitting said LOW power beacon signal and incrementing a LOW power count if said corresponding proximity signal is not detected and until said LOW power count reaches a first predetermined amount;

emitting said MED power beacon signal;

incrementing a MED power count if said corresponding proximity signal is not detected and said MED power count has not yet received a second predetermined amount; and closing said access barrier if said medpower count reaches said second predetermined amount.

54. The method according to claim 53, further comprising:

resetting said count values to zero; and changing said positional state from DOCKED to AWAY.

55. The method according to claim 38, further comprising:

identifying said proximity device with said controller; and storing at least one direction profile in said controller.

56. The method according to claim 55, further comprising:

periodically emitting a direction beacon signal having at least one power level.

57. The method according to claim 56, further comprising:

returning an acknowledge signal from said proximity device whenever said direction beacon signal as received.

58. The method according to claim 57, further comprising:

generating an actual profile based upon return of said acknowledge signals; and comparing said actual profile to said base profile.

59. The method according to claim 58, further comprising:

implementing corrective action if said direction profile does not match said actual profile.

60. The method according to claim 59, further comprising:

withdrawing the corrective action taken if said direction profile matches said actual profile.

61. The method according to claim 59, further comprising:

moving at least one of the access barriers to a blocking position for said implementing step;

sending a warning signal to said proximity device; and generating a sensory output by said proximity device when said warning signal is received.

62. The method according to claim 59, further comprising:

sending a warning signal to other said proximity devices when said corrective action is taken; and generating a sensory output by said proximity devices when said warning signal is received.

63. The method according to claim 39, further comprising:

carrying a global positioning sensor in said proximity device;

providing a learn button with said proximity device;

providing a program button with said operator controller;

actuating said program button to initiate a learn phase;

moving said proximity device to an action position;

actuating said learn button during said learn phase to transmit an action position signal generated by said sensor;

receiving said action position signal by said beacon transceiver; and storing said action position signal in a memory device associated with said controller.

64. The method according to claim 63, further comprising:

moving said proximity device to a park position;

actuating said learn button during said learn phase to transmit a park position signal generated by said sensor;

receiving said park position signal by said beacon transceiver; and storing said park position signal in said memory device.

65. The method according to claim 39, further comprising:

providing a global positioning sensor in said proximity device;

storing in a memory device associated with said controller an action position and a park position established by said sensor;

periodically comparing said proximity signals to said action and park positions; and checking a barrier status and said action and park positions to determine whether said access barrier should be moved.

66. The method according to claim 65, further comprising:

determining that said proximity device is in said action position for a predetermined period of time; and moving said access barrier from one position to another.

67. The method according to claim 65, further comprising:

determining that said proximity device is in said park position for a predetermined period of time; and moving said access barrier from one position to another.

68. The method according to claim 65, further comprising:

carrying an ignition status sensor in said proximity device;

generating an ignition-on signal when a vehicle carrying said proximity device is turned on;

receiving said ignition-on signal in said controller; and opening said access barrier if said park position signal and said ignition-on signal are received within a pre-determined period of time of one another.

69. The method according to claim 65, further comprising:

determining whether said proximity device is in one of said action and park positions for a predetermined period of time; and moving the access barrier upon actuation of a button on said proximity device when said proximity device is in one of said positions.

70. The operator system according to claim 2, wherein said controller during said learn phase scans a number of frequency channels within a range of frequencies and selects the most quiet frequency channel for use.

71. The method according to claim 38, further comprising:

scanning a number of frequency channels within a range of frequencies;

selecting a quiet frequency channel from said number of frequency channels; and identifying said proximity device with said controller using said quiet frequency channel.

* * * * *

UNITED STATES PATENT AND TRADEMARK OFFICE

CERTIFICATE OF CORRECTION

PATENT NO. : 7,289,014 B2
APPLICATION NO. : 10/744180
DATED : October 30, 2007
INVENTOR(S) : Mullet et al.

It is certified that error appears in the above-identified patent and that said Letters Patent is hereby corrected as shown below:

Column 26, line 17 (Claim 57, line 4) the word “as” should read --is--.

Signed and Sealed this

Sixth Day of May, 2008

JON W. DUDAS
*Director of the United States Patent and Trademark Office*